(12) United States Patent
Su

(10) Patent No.: US 10,397,586 B2
(45) Date of Patent: Aug. 27, 2019

(54) CHROMA RESHAPING

(71) Applicant: Dolby Laboratories Licensing Corporation, San Francisco, CA (US)

(72) Inventor: Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 219 days.

(21) Appl. No.: 15/471,321

(22) Filed: Mar. 28, 2017

(65) Prior Publication Data

US 2017/0289555 A1 Oct. 5, 2017

Related U.S. Application Data

(60) Provisional application No. 62/315,307, filed on Mar. 30, 2016.

(51) Int. Cl.
| | |
|---|---|
| *H04N 19/186* | (2014.01) |
| *H04N 19/12* | (2014.01) |
| *H04N 19/14* | (2014.01) |
| *H04N 19/40* | (2014.01) |
| *H04N 19/89* | (2014.01) |

(52) U.S. Cl.
CPC ........... *H04N 19/186* (2014.11); *H04N 19/12* (2014.11); *H04N 19/14* (2014.11)

(58) Field of Classification Search
CPC ...... H04N 19/12; H04N 19/14; H04N 19/186; H04N 19/40; H04N 19/89
USPC .................................................... 375/240.02
See application file for complete search history.

(56) References Cited

U.S. PATENT DOCUMENTS

| | | | |
|---|---|---|---|
| 7,683,912 | B2 | 3/2010 | Yoshida |
| 8,103,096 | B2 | 1/2012 | Bala |
| 8,139,081 | B1 | 3/2012 | Daniel |
| 8,139,265 | B2 | 3/2012 | Hong |
| 8,687,091 | B2 | 4/2014 | Haikin |
| 8,705,152 | B2 | 4/2014 | Cho |
| 8,947,449 | B1 | 2/2015 | Dodd |
| 9,020,258 | B2 | 4/2015 | Nakamura |
| 9,077,994 | B2 | 7/2015 | Miller |
| 9,253,495 | B2 | 2/2016 | Lu |

(Continued)

FOREIGN PATENT DOCUMENTS

| | | |
|---|---|---|
| WO | 00/64189 | 10/2000 |
| WO | 2014/130343 | 8/2014 |

(Continued)

OTHER PUBLICATIONS

Kim, Hyun Mun et al "A New Color Transform for RGB Coding" Oct. 24-27, 2004, IEEE Image Processing, vol. 1, pp. 1-5.

(Continued)

*Primary Examiner* — Christopher S Kelley
*Assistant Examiner* — Kathleen M Walsh

(57) ABSTRACT

A first signal in a first color format is received. The first signal is transformed to a second signal in a second color format to be compressed using an encoder. Before encoding, the chroma components of the second signal are reshaped according to the statistical characteristics of the chroma components of the first signal to generate a third signal. In a decoder, an inverse reshaping functions is applied to the chroma components of the decoded signal to generate an approximation of the second signal.

12 Claims, 15 Drawing Sheets

(56) References Cited

U.S. PATENT DOCUMENTS

| | | | |
|---|---|---|---|
| 9,264,681 B2 | 2/2016 | Gish | |
| 2009/0196338 A1* | 8/2009 | Ali | H04N 19/85 |
| | | | 375/240.01 |
| 2012/0314944 A1* | 12/2012 | Ninan | H04N 19/647 |
| | | | 382/166 |
| 2015/0043815 A1 | 2/2015 | Tan | |
| 2016/0014420 A1 | 1/2016 | Su | |
| 2016/0269733 A1* | 9/2016 | Tourapis | H04N 19/189 |
| 2017/0085878 A1* | 3/2017 | Sole Rojals | H04N 19/124 |
| 2017/0085889 A1* | 3/2017 | Baylon | H04N 19/124 |
| 2018/0242006 A1* | 8/2018 | Kerofsky | H04N 19/70 |
| 2018/0278967 A1* | 9/2018 | Kerofsky | G06T 5/009 |

FOREIGN PATENT DOCUMENTS

| | | | |
|---|---|---|---|
| WO | 2014/204865 | 12/2014 | |
| WO | WO-2014204865 A1 * | 12/2014 | H04N 196/176 |
| WO | 2016/049327 | 3/2016 | |
| WO | 2016/140954 | 9/2016 | |

OTHER PUBLICATIONS

Singh, Satish Kumar et al "Novel Adaptive Color Space Transform and Application to Image Compression" Signal Processing: Image Communication, vol. 26, Issue 10, Nov. 2011, pp. 662-672.

Lu, T. et al "ITP Colour Space and Its Compression Performance for High Dynamic Range and Wide Colour Gamut Video Distribution" Feb. 5, 2016, vol. 14, No. 1, pp. 32-38.

Ebner, F. et al "Development and Testing of a Color Space (IPT) with Improved Hue Uniformity" Proc. 6th Color Imaging Conference: Color Science, Systems, and Applications, IS&T, Scottsdale, Arizona, Nov. 1998, pp. 8-13.

SMPTE ST 2084:2014 "High Dynamic Range Electro-Optical Transfer Function of Mastering Reference Displays" Aug. 16, 2014, pp. 1-14.

ITU-R, Report BT. 2390-0 (2016) "High Dynamic Range Television for Production and International Programme Exchange".

Minoo (Aaris) K et al "Description of the Reshaper Parameters Derivation Process in ETM Reference Software" JCT-VC Meeting Feb. 19-26, 2016.

* cited by examiner

CHROMA RESHAPING

CROSS-REFERENCE TO RELATED APPLICATION(S)

The present application claims priority to U.S. Provisional Patent Application No. 62/315,307, filed Mar. 30, 2016, which is incorporated herein by reference in its entirety.

TECHNOLOGY

The present disclosure relates generally to images. More particularly, an embodiment of the present disclosure relates to signal reshaping of images with high dynamic range.

BRIEF DESCRIPTION OF THE DRAWINGS

An embodiment of the instant disclosure is illustrated by way of example, and not in way by limitation, in the figures of the accompanying drawings and in which like reference numerals refer to similar elements and in which.

DESCRIPTION OF EXAMPLE EMBODIMENTS

Figure 1:
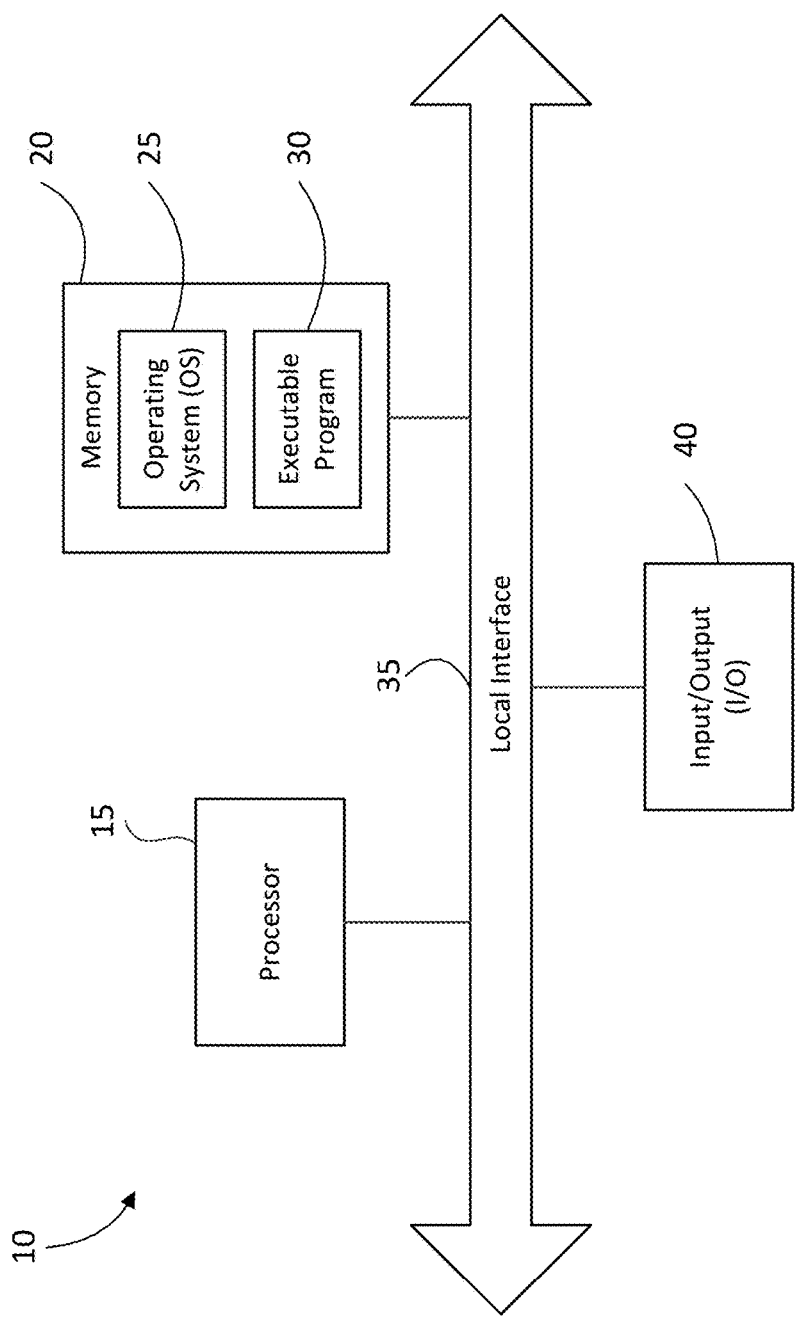
FIG. 1 depicts a first example hardware embodiment.

As used herein, the term 'dynamic range' (DR) may relate to a capability of the human visual system (HVS) to perceive a range of intensity (e.g., luminance, luma) in an image, e.g., from darkest darks (blacks) to brightest whites (i.e., highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components YCbCr (e.g., luma Y and chroma Cb and Cr) wherein color components are represented by a precision of n-bits per pixel (e.g., n=8). Using linear luminance coding, images where n≤8 (e.g., color 24-bit Joint Photographics Experts Group (JPEG) images) are considered images of standard dynamic range, while images where n>8 may be considered images of enhanced dynamic range. EDR and HDR images may also be stored and distributed using high-precision (e.g., 16-bit) floating-point formats.

As used herein, the term "color format" denotes the color space (e.g., YCbCr, RGB, ICtCp, and the like), color sampling (e.g., 4:2:0), EOTF (e.g., gamma, PQ, HLG, etc.), and other parameters defining the luma and chroma characteristics of the video signal. The color space variable may be in a format (for example Red Green Blue (RGB), Luma Y, Blue minus Luma U and Red minus Luma V (YUV), YCbCr, and the like) and a chroma subsampling variable (for example 4:4:4, 4:2:0, and the like). Additionally, the concepts in the instant application apply also to electro optical transfer functions (EOTFs) such as gamma or Perceptual Quantization (PQ). An EOTF describes how digital words are translated into light to be viewed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Signal reshaping and coding of high dynamic range (HDR) images is described herein. In the following description, for the purposes of explanation, numerous specific details are set forth in order to provide a thorough understanding of the instant disclosure. It will be apparent, however, that the instant disclosure may be practiced without these specific details. In other instances, well-known structures and devices are not described in exhaustive detail, in order to avoid unnecessarily occluding, obscuring, or obfuscating the instant disclosure.

Overview

Example embodiments described herein relate to the reshaping and coding of high-dynamic range images, e.g. HDR video. Three overall scenarios are envisioned, one in which the input video signal is a codec friendly video signal that is converted to a codec unfriendly video signal, the codec unfriendly video signal then being reshaped to obtain a third video signal so that a statistical characteristic of the third video signal is similar to a corresponding statistical characteristic of the input video signal. A second scenario may have an input video signal which is codec unfriendly, that is converted to a codec friendly video signal, the input video signal then being reshaped to obtain a third video signal having a statistical characteristic similar to the codec friendly video signal. In a third scenario, an input video signal is converted to a codec friendly video signal and is also converted to a codec unfriendly video signal, wherein the codec unfriendly signal is reshaped to obtain a third video signal that has a statistical characteristic similar to the coded friendly signal.

In an embodiment of a method to reshape a high-dynamic range video signal, the method comprises: obtaining a first video signal representing the high-dynamic range video signal in a first color format comprising a first chroma component, obtaining a second video signal representing the high-dynamic range video signal in a second color format comprising a second chroma component, applying, by a processor, a chroma reshaping function to the second chroma component of the second video signal to generate a reshaped chroma component, wherein the chroma reshaping function maps pixel values of the second chroma component of the second color format to pixel values of the first chroma component of the first color format, wherein at least one parameter of the chroma reshaping function is determined by fitting the chroma reshaping function to pixel values $v_{ji}$ of the second chroma component of the second video signal and pixel values $s_{ji}$ of the first chroma component of the first video signal, generating, by the processor, a third video signal comprising the reshaped chroma component. A color format may comprise a color space and/or a color sampling and/or an EOTF. The first color format is different from the second color format.

In an embodiment, the first signal corresponds to a codec friendly signal, whereas the second signal corresponds to a codec unfriendly signal.

Example Hardware

FIG. 1 depicts a first exemplary embodiment of a target hardware for implementation of an embodiment of the present disclosure.

FIG. 1 is an exemplary embodiment of a target hardware (10) (e.g., a computer system) for implementing the embodiments of FIGS. 2-15. This target hardware comprises a processor (15), a memory bank (20), a local interface bus (35) and one or more Input/Output devices (40). The processor may execute one or more instructions related to the implementation of FIGS. 2-15, and as provided by the Operating System (25) based on some executable program (30) stored in the memory (20). These instructions are carried to the processor (15) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, inputting data and/or commands from a touchscreen, outputting data to a display, or outputting data to a Universal Serial Bus (USB) flash drive. In some embodiments, the operating system (25) facilitates these tasks by being the central element to gathering the various data and instructions required for the execution of the program and provide these to the microprocessor. In some embodiments the operating system may not exist, and tasks are under direct control of the processor (15), although the basic architecture of the target hardware device (10) will remain the same as depicted in FIG. 1. In some embodiments a plurality of processors may be used in a parallel configuration for added execution speed. In such a case, the executable program may be specifically tailored to a parallel execution. Also, in some embodiments the processor (15) may execute part of the implementation of FIGS. 2-15, and some other part may be implemented using dedicated hardware/firmware placed at an Input/Output location accessible by the target hardware (10) via local interface (35). The target hardware (10) may include a plurality of executable programs (30), which may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

Example Video Delivery Processing Pipeline

Figure 2:
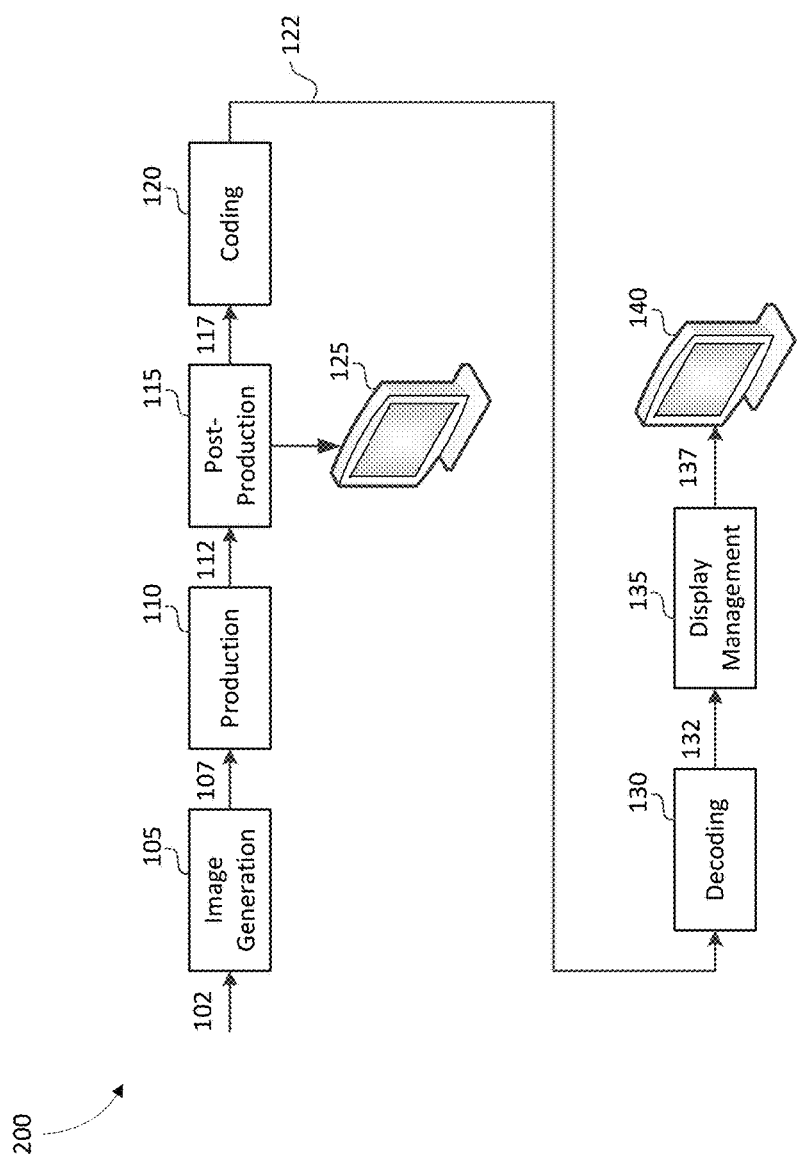
FIG. 2 depicts an example process for a video delivery pipeline.

FIG. 2 depicts an example process of a conventional video delivery pipeline (200) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by Advanced Television Systems Committee (ATSC), Digital Video Broadcasting (DVB), Digital Video Disk (DVD), Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have different characteristics than the reference display (125). In that case, a display management block (135) may be used to map the dynamic range of decoded signal (132) to the characteristics of the target display (140) by generating display-mapped signal (137).

The IPT-PQ Color Space

In an embodiment, without limitation, part of the processing pipeline, for example, coding (120), decoding (130), and display management (135) may be performed in what will be referred to as the IPT-PQ color space. An example use of the IPT-PQ color space for display management application may be found in "Display Management for High Dynamic Range Video," World Intellectual Property Organization (WIPO) Publication WO 2014/130343, by R. Atkins et al., which is incorporated by reference in its entirety. The IPT color space, as described in "*Development and testing of a color space (ipt) with improved hue uniformity*", by F. Ebner and M. D. Fairchild, in Proc. 6$^{th}$ Color Imaging Conference: Color Science, Systems, and Applications, IS&T, Scottsdale, Ariz., November 1998, pp. 8-13 (to be referred to as the Ebner paper), which is incorporated herein by reference in its entirety, is a model of the color difference between cones in the human visual system. In this sense it is like the YCbCr or the CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In an embodiment, a perceptual quantizer function maps linear input gray levels to output gray levels that better match the contrast sensitivity thresholds in the human visual system. Examples of PQ mapping functions are described in U.S. Pat. No. 9,077,994 (to be referred as the '994 patent)," by J. S. Miller et al., which is incorporated herein by reference in its entirety, parts of which have been adopted by the Society of Motion Picture and Television Engineers (SMPTE) ST 2084:2014 specification, titled "High Dynamic Range Electro-optical Transfer Function of Mastering Reference Displays," Aug. 16, 2014, incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '994 patent, imitates the true visual response of the human visual system using a relatively simple functional model. While most discussions within the disclosure pertain to IPT-PQ, the methods and devices may be applicable to other color spaces suitable for High Dynamic Range (HDR) imaging including ICtCp, Hybrid-Log Gamma (HLG) and the like.

IPT-PQ Versus YCbCr-Gamma

Most of the existing video compression standards, such as Motion Pictures Experts Group (MPEG), MPEG-1, MPEG-2, Advanced Video Coding (AVC), High Efficiency Video Coding (HEVC), and the like, have been tested, evaluated, and optimized for gamma-coded images in the YCbCr color space; however, experimental results have shown that the IPT-PQ color space may provide a better representation format for high-dynamic range images with 10 or more bits per pixel per color component. Signal encoding in color spaces that are better suited for HDR and wide color gamut signals (e.g., IPT-PQ) may yield better overall picture quality. For purposes of this disclosure YCbCr color space encoding is considered more compression friendly than the IPT-PQ color space encoding, which may be considered compression unfriendly.

The $IC_TC_P$ Color Space $IC_TC_P$, also to be referred as ICtCp (or ITP), is a proposed new color space especially designed for processing high dynamic range and Wide Color Gamut (WCG) signals. As with IPT-PQ, I (Intensity) denotes the brightness of the PQ-encoded signal, $C_T$, Tritan Axis, corresponds to blue-yellow perception, and $C_P$, Protan Axis, corresponds to red-green color perception. In addition to the discussed features of IPT-PQ, in $IC_TC_P$:

The chroma is rotated to align skin tones more closely to YCbCr;

The XYZ to Long Medium Short (LMS) matrix is optimized for better uniformity and linearity for WCG images; and The L'M'S' to ICtCp matrix is optimized to improve isoluminance and stability with respect to HDR and WCG images.

Hybrid-log gamma (HLG) is also an alternative representation of high-dynamic range images. A detailed description of the $IC_TC_P$ color space and HLG may be found in International Telecommunications Union Radio communication Sector (ITU-R) Report BT. 2390-0 (2016), "*High dynamic range television for production and international programme exchange*," which is incorporated herein by reference in its entirety.

As used herein, the term "isoluminance" refers to a measure of how well luminance (say, I of ICtCp or Y' of Y'Cb'Cr') correspond to luminance Y. Indirectly, it measures how well a color space separates luma from chroma.

From an implementation point of view, using the $IC_TC_P$ color space requires the same hardware and signal flow as using the traditional gamma-coded YCbCr. For example, consider using gamma-corrected YCbCr (Y'Cb'Cr') in a camera pipeline.

Compression Friendly Versus Compression Unfriendly

Video signals in IPTPQ, $IC_TC_P$, or any other HDR-specific color formats (such as, HLG) differ from existing codec friendly video signals such as YCbCr, this difference may include statistical differences between the color formats which may comprise color spaces, color samplings and EOTFs. One possible conversion is the codec transform for broadcast of a 10-bit YCbCr 4:2:2 PQ input signal to yield an IPTPQ or $IC_TC_P$ 4:2:0 output signal from encoding. In one example, a color format conversion from YCbCr to IPTPQ or $IC_TC_P$ may be performed. The chroma information in an IPTPQ or $IC_TC_P$ signal may be rich in chroma information and poor in luma information. Without reshaping, the chroma portion of the signal may require many bits to encode and assign fewer bits to luma, resulting in a color rich, yet motion blurred picture. Thus, reshaping may make the chroma signal more compression friendly and allow a picture both rich in color and sharp in detail.

EXAMPLES

Figure 3:
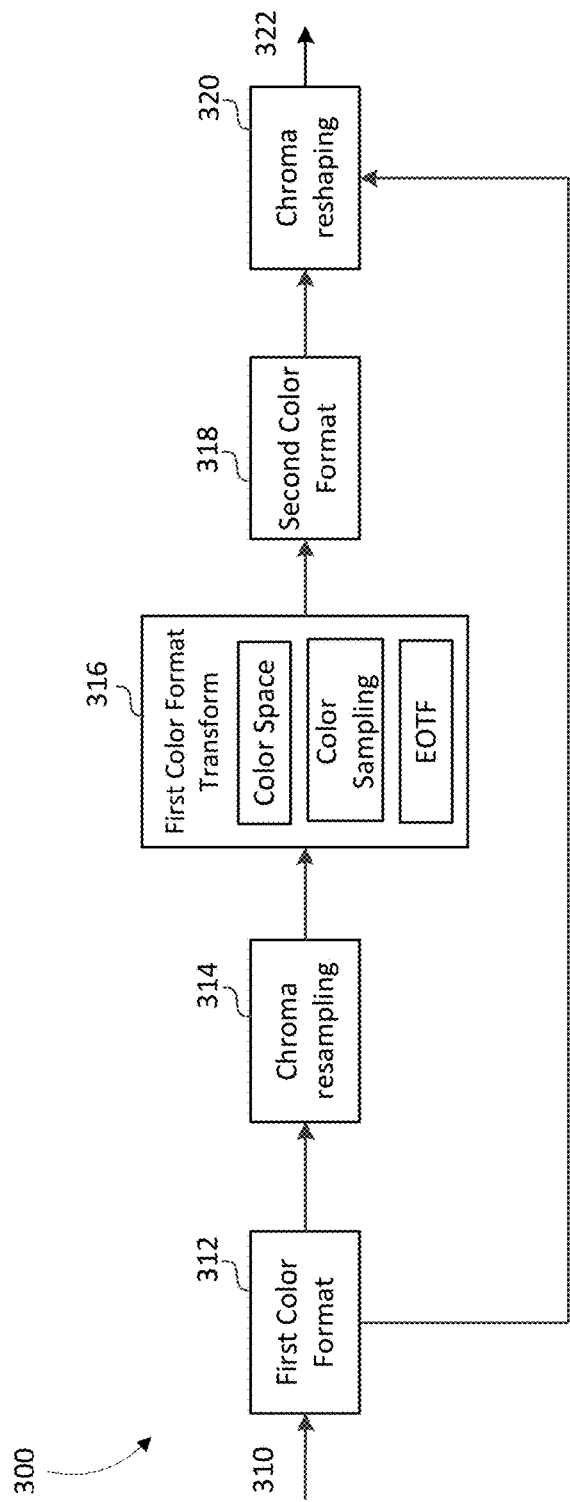
FIG. 3 depicts a first example process for chroma reshaping in accordance with an embodiment of the disclosure.

FIG. 3 depicts in more detail an example process (300) for the chroma reshaping in accordance with an embodiment. An input signal 310 is received and is rendered 312 in a first color format such as a 10 bit YCbCr 4:2:2, which in this instance is considered compression friendly. The phrase compression friendly in this example indicates that the standard deviation of the rendered signal is well controlled and does not have an excessively long tail. The length of the tail indicates the energy required to compress the signal, if the tail is short, the compression does not require a large number of bits. The chroma is resampled 314 in which statistical characteristics of the rendered signal are determined for future matching. The color format is transformed 316 and the color space, color sampling and/or EOTF are converted, yielding a codec unfriendly second color format 318. The codec unfriendly transform having unwieldy statistical characteristics which will be reviewed against the statistical characteristics of the resampled signal. A chroma reshaping 320 is then performed in which the transformed signal 318 is modified or reshaped to mimic the statistical characteristics of the compression friendly signal 312, yielding a reshaped signal 322.

Figure 4:
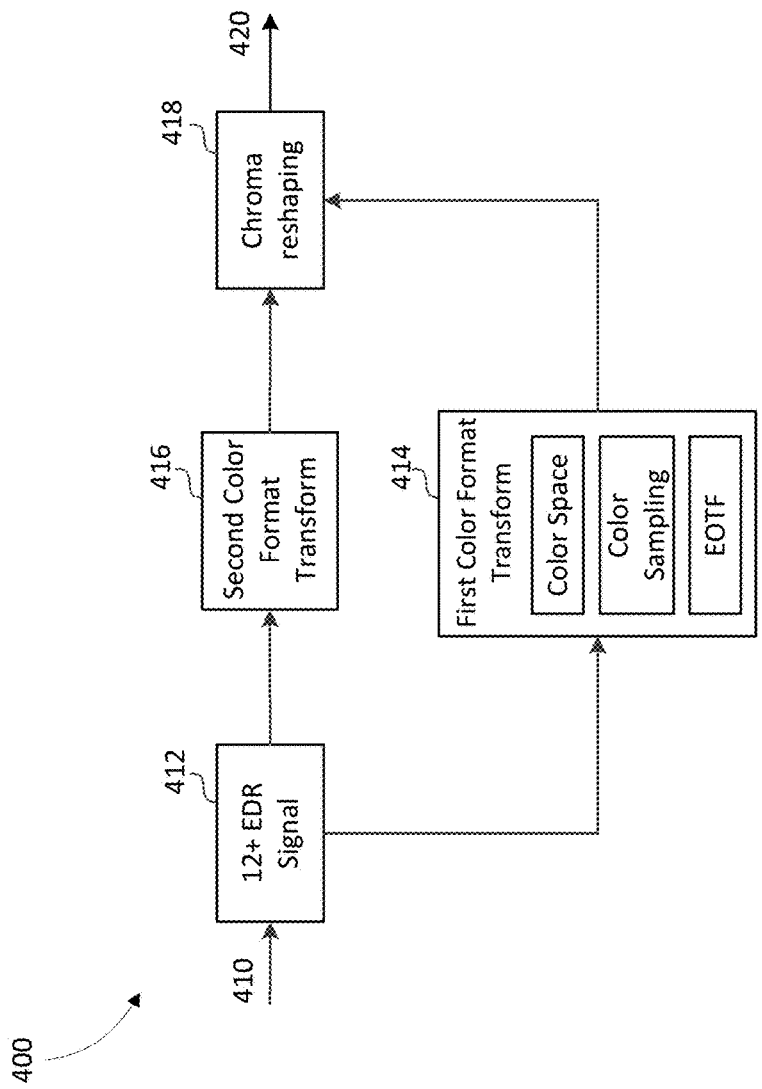
FIG. 4 depicts a second example process for chroma reshaping using an Enhanced Dynamic Range (EDR) source and a reference signal in accordance with an embodiment of the disclosure.

FIG. 4 depicts in more detail an example process 400 for the chroma reshaping in accordance with an embodiment. As depicted in FIG. 4, an input signal 410 may be a 12+ bit EDR signal 412, i.e. an EDR signal having a bit depth of 12 bits or more per component. The input signal undergoes two color format transforms, the first color format transform 414 transforms the input signal into a coder friendly color format such as YCbCr and the second color format transform 416 transforms the input signal into a coder unfriendly format such as IPT-PQ. A statistical analysis of the coder friendly format will yield a set of encoder and compression friendly statistical parameters. Thus, a color format transform 416 of the EDR signal 412 into a color unfriendly format such as IPT-PQ may be reshaped 418 to generate a signal (420) that matches some of the statistical parameters of the coder friendly format, thus making the signal compression easier. This reshaping of the color format allows richer colors to be viewed while still retaining the sharpness and fluidity of motion of the picture, i.e. the luma of the signal.

Using chroma reshaping, it may be possible to increase luma peak signal to noise ratio up to 1 dB, average around 0.75 dB for IPTPQ and up to 1.37 dB and average 0.75 dB for ICtCp. One method of this disclosure will be to reshape with a view toward the reference codec friendly signal, such that the reshaped signal has similar characteristics as the reference codec friendly signal.

Chroma Signal Characteristics and Transform

The standard deviation of a signal may represent the amount of energy contained in the signal and thus a bit rate to compress the signal. If a standard deviation of the distribution of color saturation of an IPT-PQ signal is analyzed, the color saturation may have a long standard deviation tail, indicating a higher amount of energy to encode the signal. This higher energy may translate to a higher bit count to encode the data, leaving the luma portion of the signal lacking in bits which translates into a loss of detail. What is sought is a way to reduce the energy of encoding the color in order to retain the sharpness of detail communicated by the luma portion of the signal.

Transform Signal Characteristics

A low local standard deviation may be obtained utilizing current codecs to perform the transform. Reshaping may change the signal statistical characteristics. The following is a simple mathematical proof.

Denote the $i^{th}$ pixel of the $j^{th}$ frame within a scene of the first signal as $s_{ji}$ and the corresponding pixel in the second signal as $v_{ji}$. Assume each frame has P pixels. Let the bit depth in the base layer (BL) is BL_bitdepth, the number of possible values of BL is $N=2^{BL\_bitdepth}$. If a reshaping function v=f(s), is utilized and the dynamic range between pixels is similar, a linear reshaping may be used having a slope $m_1$ and intercept $m_0$ to model the forward reshaping:

$$v_{ji} = m_1 \cdot s_{ji} + m_0.$$

Let the variance in the EDR signal around pixel i at frame j be computed as:

$$\text{var}_{V_{ji}} = \frac{1}{N}\sum_i \left(v_{ji} - \frac{1}{N}\sum_i v_{ji}\right)^2,$$

$$\text{var}_{S_{ji}} = \frac{1}{N}\sum_i \left(s_{ji} - \frac{1}{N}\sum_i s_{ji}\right)^2.$$

The mean after reshaping becomes:

$$\bar{v}_{ji} = \frac{1}{N}\sum_i v_{ji}$$
$$= \frac{1}{N}\sum_i (m_1 \cdot s_{ji} + m_0)$$
$$= \frac{m_1}{N}\sum_i s_{ji} + m_0$$

The variance in a base layer (BL) is given by:

$$\text{var}_{V_{ji}} = \frac{1}{N}\sum_i (v_{ij} - \bar{v}_{ji})^2$$
$$= \frac{1}{N}\sum_i \left(m_1 \cdot s_{ji} + m_0 - \frac{m_1}{N}\sum_i s_{ji} - m_0\right)^2$$
$$= \frac{1}{N}\sum_i \left(m_1 \cdot \left(s_{ji} - \frac{1}{N}\sum_i s_{ji}\right)\right)^2$$
$$= m_1^2 \cdot \frac{1}{N}\sum_i \left(s_{ji} - \frac{1}{N}\sum_i s_{ji}\right)^2$$
$$= m_1^2 \cdot \text{var}_{S_{ji}}$$

The standard deviation is then:

$$\sigma_{V_{ji}} = m_1 \cdot \sigma_{S_{ji}}.$$

Indicating that the characteristics of signal may be modified via reshaping.

Example Framework

Figure 5:
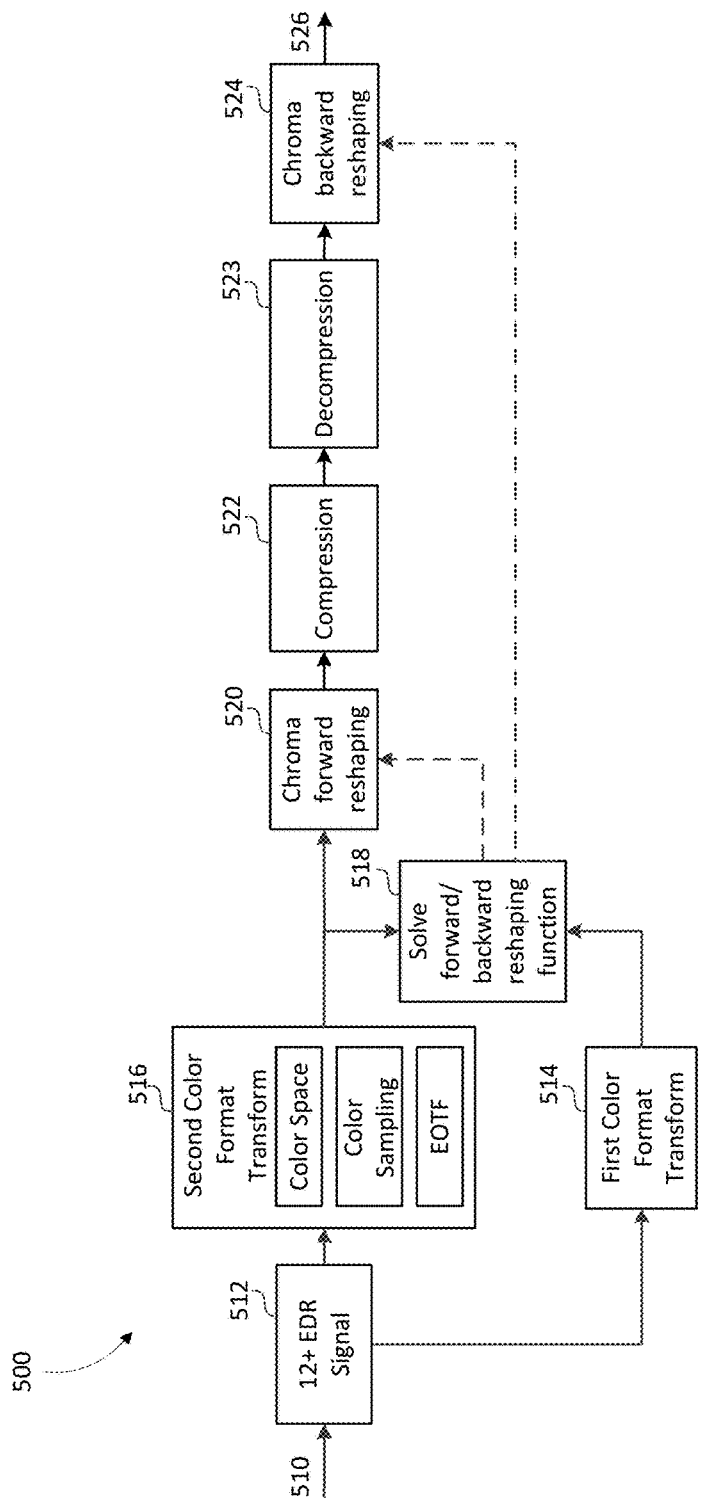
FIG. 5 depicts a third example process for chroma reshaping using an Enhanced Dynamic Range (EDR) source and a reference signal and solving forward and backward reshaping in accordance with an embodiment of the disclosure.

An example framework (500) is depicted in FIG. 5. A signal 510 is input and comprises a 12+ bit EDR signal 512, i.e. an EDR signal having a bit depth of 12 bits or more per component, that is transformed using a first color format transform 514 into a codec friendly video signal. The 12+ bit EDR signal 512 is also transformed using a second color transform 516 into a codec unfriendly video signal, one that is not modified to reduce a large statistical tail. Both color formats may comprise a color space, and/or a color sampling and/or an EOTF. The first color format is different from the second color format. The first color format is a codec friendly color format, and the first signal has a smaller statistical tail and is more readily compressed. The first and second signals are used to determine a reshaping function in both forward and backward directions 518, e.g. solving a systems of linear equations to obtain the coefficients of a polynomial reshaping function. The adjustment or reshaping of the chroma transform allows for increased luma information in the signal and also allows the reshaped data to be more easily compressed. The chroma component of the second signal is reshaped in a forward direction 520 and the reshaped signal is included in a third video signal. The third video signal may further include the original luma component of the first video signal, or a reshaped version of the luma component of the first video signal. The third video signal may comprise one or more reshaped chrome components. For example, the first video signal may comprise two chroma components, and a respective chroma reshaping function is applied to each of said chroma components, wherein the chroma reshaping function may be different for the different chroma components, and the third video signal may include the two reshaped chroma components and one of an original luma component of the first video signal and a reshaped luma component. The third video signal is compressed 522 using an encoder to obtain a coded bitstream. The decoder is represented by blocks 523 and 524. The output of the encoder, i.e. the compressed third signal, is decompressed 523 and subsequently the backward reshaping function is applied 524 to obtain the decoded signal 526. When a second signal is reshaped to a third video signal, that operation is called forward reshaping, since a real signal is converted into the reshaped color format. At the decoder side, when a reshaped signal is converted back to a real signal color format, this operation is called backward reshaping. The backward reshaping is the inverse operation of forward reshaping to bring back the third video signal to the second video signal, i.e. to undo the forward chroma reshaping.

The chroma reshaping function may optionally be a one-to-one function, i.e. an injective function and may optionally also be onto/surjective, i.e. the function may be bijective.

One possible solution, is to determine a reshaping function that maps the second signal to the first signal, such as a prediction function. The prediction function should be stable across an entire scene and may take several forms, such as a single polynomial, a look up table, a multi-section polynomial and the like.

Assuming that the $i^{th}$ pixel of the $j^{th}$ frame within a scene of the first signal as $s_{ji}$ and the corresponding pixel in the second signal as $v_{ji}$ and that each frame has P pixels. Let the bit depth in the base layer is BL_bitdepth, the number of possible values in BL is $N=2^{BL\_bitdepth}$.

Single Polynomial

A second order polynomial is used in this example, however, in many cases, a first order equation may suffice. In another example, the reshaping function may be defined by a first order equation having an intercept of zero, i.e. a reshaping function that corresponds to a constant scaling factor: $v_{ji} = m_1 * s_{ji}$.

The reference pixel at $i^{th}$ pixel of the $j^{th}$ frame may be estimated from a polynomial predictor with coefficients $m_0$, $m_1$, and $m_2$. The coefficients are obtained from frames accumulated within a scene.

$$\hat{v}_{ji} = m_0 + m_1 \cdot s_{ji} + m_2 \cdot (s_{ji})^2.$$

For frame j:

$$\begin{bmatrix} \hat{v}_{j0} \\ \hat{v}_{j1} \\ \hat{v}_{j2} \\ \vdots \\ \hat{v}_{j,P-1} \end{bmatrix} = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix} \begin{bmatrix} m_{j0} \\ m_{j1} \\ m_{j2} \end{bmatrix},$$

or $$v_j = S_j m_j,$$

where $$\hat{v}_j = \begin{bmatrix} \hat{v}_{j0} \\ \hat{v}_{j1} \\ \hat{v}_{j2} \\ \vdots \\ \hat{v}_{j,P-1} \end{bmatrix},$$

$$S_j = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix} \quad m_j = \begin{bmatrix} m_{j0} \\ m_{j1} \\ m_{j2} \end{bmatrix}.$$

A least squared solution for frame j is given by:

$$m_j = ((S_j)^T (S_j))^{-1} ((S_j)^T v_j).$$

If the two major matrixes are defined as:

$$B_j = \begin{bmatrix} b_{j,00} & b_{j,01} & b_{j,02} \\ b_{j,10} & b_{j,11} & b_{j,12} \\ b_{j,20} & b_{j,21} & b_{j,22} \end{bmatrix}$$

$$= (S_j)^T (S_j)$$

$$= \begin{bmatrix} 1 & 1 & 1 & \cdots & 1 \\ s_{j0} & s_{j1} & s_{j2} & \cdots & s_{j,P-1} \\ s_{j0}^2 & s_{j1}^2 & s_{j2}^2 & \cdots & s_{j,P-1}^2 \end{bmatrix} \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix}$$

Elements may be expressed as:

$$b_{j,00} = P$$

$$b_{j,01} = b_{j,10} = \sum_{i=0}^{P-1} s_{ji}$$

$$b_{j,20} = b_{j,11} = b_{j,02} = \sum_{i=0}^{P-1} (s_{ji})^2$$

$$b_{j,21} = b_{j,12} = \sum_{i=0}^{P-1} (s_{ji})^3$$

$$b_{j,22} = \sum_{i=0}^{P-1} (s_{ji})^4$$

The second matrix then becomes:

$$a_j = \begin{bmatrix} a_{j,0} \\ a_{j,1} \\ a_{j,2} \end{bmatrix}$$

$$= (S_j)^T v_j$$

$$= \begin{bmatrix} 1 & 1 & 1 & \ldots & 1 \\ s_{j0} & s_{j1} & s_{j2} & \ldots & s_{j,P-1} \\ s_{j0}^2 & s_{j1}^2 & s_{j2}^2 & \ldots & s_{j,P-1}^2 \end{bmatrix} \begin{bmatrix} \hat{v}_{j0} \\ \hat{v}_{j1} \\ \hat{v}_{j2} \\ \vdots \\ \hat{v}_{,P-1} \end{bmatrix},$$

Elements may be expressed as:

$$a_{j,0} = \sum_{i=0}^{P-1} v_{ji}$$

$$a_{j,1} = \sum_{i=0}^{P-1} (s_{ji} v_{ji})$$

$$a_{j,2} = \sum_{i=0}^{P-1} ((s_{ij})^2 v_{ji}).$$

To obtain the scene based solution, for frame 0 to J−1, matrix B and a may be obtained from:

$$B = \sum_{j=0}^{J-1} B_j,$$

$$a = \sum_{j=0}^{J-1} a_j.$$

The matrix elements may be obtained by accumulating values across frames.
Coefficients may be obtained using:

$$m = B^{-1} a.$$

The coefficients of the polynomial may be transmitted from the encoder to the decoder via metadata. The decoder uses the transmitted coefficients for the backward reshaping function.

For example, for the first order, the backward reshaping becomes:

$$\tilde{s}_{ji} = \frac{1}{m_1} v_{ji} - \frac{m_0}{m_1}.$$

The entire range may be shifted to the center.
Alternatively, the backward reshaping may be performed using a look-up table transmitted from the encoder to the decoder via metadata (such as Supplemental Enhancement Information (SEI) messaging).

Scene Based One Dimensional Look Up Table

In non-linear cases a one dimensional look up table (1D-LUT) may be used to capture the reshaping function. One possible solution may take the form:

```
for( b = 0 : b < N; b ++ )
    finding the set of pixel having value b within the scene:
    Φ_b = {i, j | s_ji = b, j = 0,..., F − 1}
    obtaining the average value in the corresponding pixel position
    from original EDR data:
```

$$m_b = \frac{1}{|\Phi_b|} \sum_{i,j \in \Phi_b} v_{ji}$$

```
End
```

The $\{m_b\}$ where $b=0, \ldots 2^{BL\_bitdepth}-1$ may be the scene-based code in terms of Mean Squared Err (MSE). Another algorithm that may be used to obtain the LUT is listed below.

```
// initialization
h_{j,b} = 0 for b = 0, ..., 2^{BL_bitdepth} − 1
w_{j,b} = 0 for b = 0, ..., 2^{BL_bitdepth} − 1
// scan for each pixel
for ( j = 0 : j < F; j ++ )
    for ( i= 0 ; i < P; i++ )
        h_{j,s_ji} ++;
        w_{j,s_ji} += v_ji
    end
end
// for each codeword, find optimal LUT
1^st_flag = 0;
for ( b = 0 ; b < N; b ++ )
```

$$if\left(\sum_{j=0}^{F-1} h_{j,b} > \Delta\right)$$

```
        if(1^st_flag == 0 )
            1^st_flag = 1
            θ = b / N ;
        end
```

$$m_b = \frac{\sum_{j=0}^{F-1} w_{j,b}}{\sum_{j=0}^{F-1} h_{j,b}}$$

```
    else
        m_b = −1
    end
end
// interpolate entries with m_b = −1
for ( b = 0 ; b < N; b ++ )
    if( m_b = −1 )
        linearly interpolate from nearest available neighbors
    end
end
```

```
// Detecting decreased slope correction and flip the sign
m₀' = 0
for ( b = 1 ; b < N; b ++ )
    Δm_b = |m_b − m_{b−1}|
    m_b' = m_{b−1}' + Δm_b
end
for ( b = 0 ; b < N; b ++ )    // add the offset back
    m_b' = m_b' + θ
end
// smoothen curve
for ( b = W ; b < N-W; b ++ )

m̃_b = (1 / (2W + 1)) Σ_{k=b−W}^{b+W} m'_k end
// clip to valid range
for ( b = 0 ; b < N; b ++ )    // add the offset back
    m̃_b = clip3(m̃_b , 0, N-1);
end
```

The one dimensional look up table may also be approximated via a second order polynomial.

Real-Time Reshaping

A sliding window with α look ahead frames and β past frames may be used to perform real-time reshaping. With a look ahead sliding, statistics may be collected within α+β+1 frames, and then calculate the reshaping function for frame j.

Real-Time Polynomial

To obtain the scene based solution, for frame j−β to j+α, matrix B and a may be computed as:

$$B = \sum_{k=j-\beta}^{j+\alpha} B_k,$$

$$a = \sum_{k=j-\beta}^{j+\alpha} a_k.$$

The matrix elements may be obtained by accumulating values across frames. Coefficients for frame j may be obtained using:

$$m = B^{-1}a.$$

Real-Time One Dimensional Look Up Table

The following algorithm may be used to construct a 1D-LUT on a frame by frame basis.

```
// initialization for each frame
h_{j+α,b} = 0 for b = 0, ..., 2^{BL_bitdepth} − 1
w_{j+α,b} = 0 for b = 0, ..., 2^{BL_bitdepth} − 1
// scan for each pixel for the look ahead frame
for ( i = 0 ; i < P; i++ )
    h_{j+β,s_ji} ++;
    w_{j+β,s_ji} += v_ji
end
// for each codeword, find optimal LUT
1^{st}_flag = 0;
for ( b = 0 ; b < N; b ++ )

if( Σ_{k=j−β}^{j+α} h_{k,b} > Δ )

if(1^{st}_flag == 0 )
            1^{st}_flag = 1
            θ = b / N ;
        end
```

```
        m_b = Σ_{k=j−β}^{j+α} w_{k,b} / Σ_{k=j−β}^{j+α} h_{k,b} else
        m_b = −1
    end
end
// interpolate entries with m_b = −1
for ( b = 0 ; b < N; b ++ )
    if( m_b = −1 )
        linearly interpolate from nearest available neighbors
    end
end
// Detecting decreased slope correction and flip the sign
m₀' = 0
for ( b = 1 ; b < N; b ++ )
    Δm_b = |m_b − m_{b−1}|
    m_b' = m_{b−1}' + Δm_b
end
for ( b = 0 ; b < N; b ++ )    // add the offset back
    m_b' = m_b' + θ
end
// smoothen curve
for ( b = W ; b < N-W; b ++ )

m̃_b = (1 / (2W + 1)) Σ_{k=b−W}^{b+W} m'_k end
// clip to valid range
for ( b = 0 ; b < N; b ++ )    // add the offset back
    m̃_b = clip3(m̃_b , 0, N-1);
end
```

Figure 6:
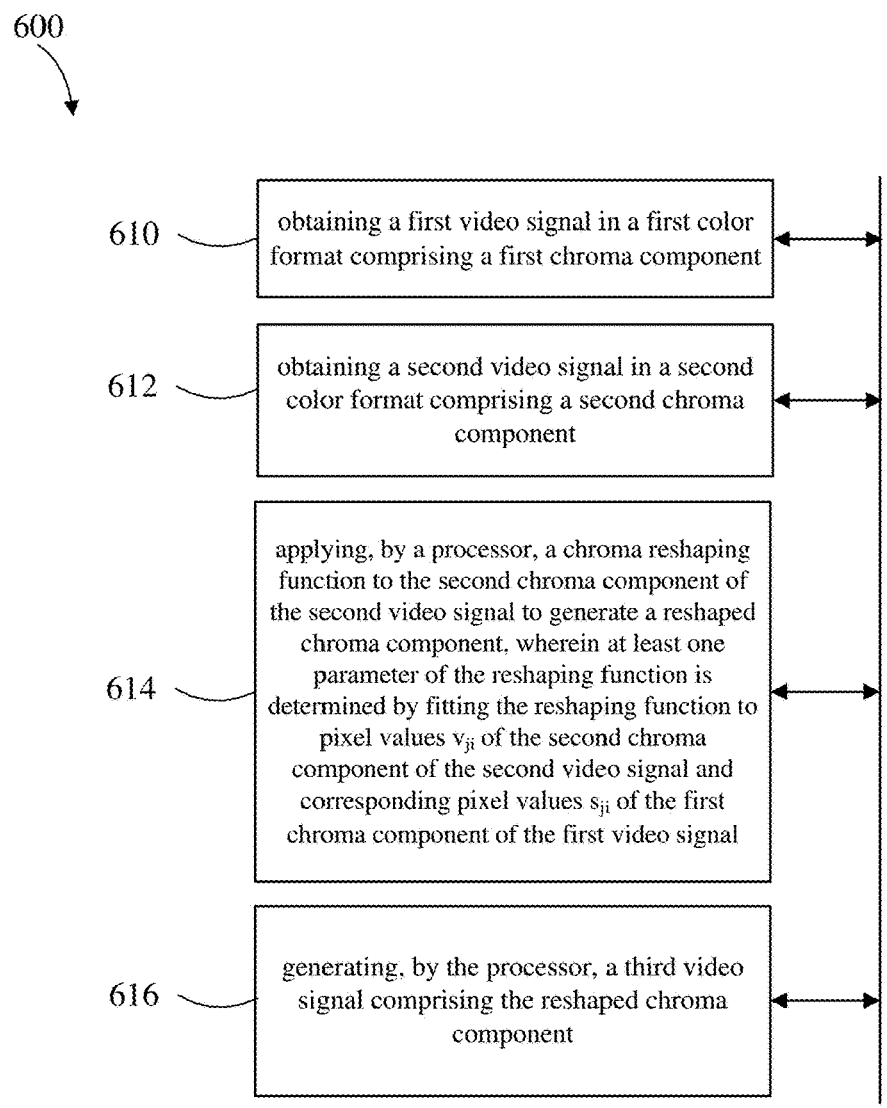
FIG. 6 depicts a first example method of chroma reshaping having a codec friendly input signal in accordance with an embodiment of the disclosure.

FIG. 6 depicts a first method 600 to reshape a high-dynamic range signal comprising obtaining 610 a first video signal in a first color format comprising a first chroma component. The method further comprises obtaining 612 a second video signal in a second color format comprising a second chroma component. Step 614 comprises applying, by a processor, a chroma reshaping function to the second chroma component of the second video signal to generate a third chroma component, wherein at least one parameter of the reshaping function is determined by fitting the reshaping function to pixel values $v_{ji}$ (also referred to as codewords) of the second chroma component of the second video signal and corresponding pixel values (codewords) $s_{ji}$ of the first chroma component of the first video signal. Therefore, the at least one parameter may be selected so that a statistical characteristic of the reshaped chroma component matches the statistical characteristic of the first chroma component of the first video signal according to a matching criterion. The statistical characteristic may be a standard deviation, a mean square error, a signal energy and the like. The method further comprises coding 616, the third video signal comprising the reshaped chroma component with an encoder to generate a coded bitstream. Optionally, the method further applies, by the processor, a luma reshaping function to a luma component of the second video signal to generate a reshaped luma component, utilizing the statistical characteristic matching criterion. The third video signal may comprise, in addition to the reshaped chroma component, at least one of a first luma component of the first video signal, a second luma component of the second video signal and the reshaped luma component.

Figure 7:
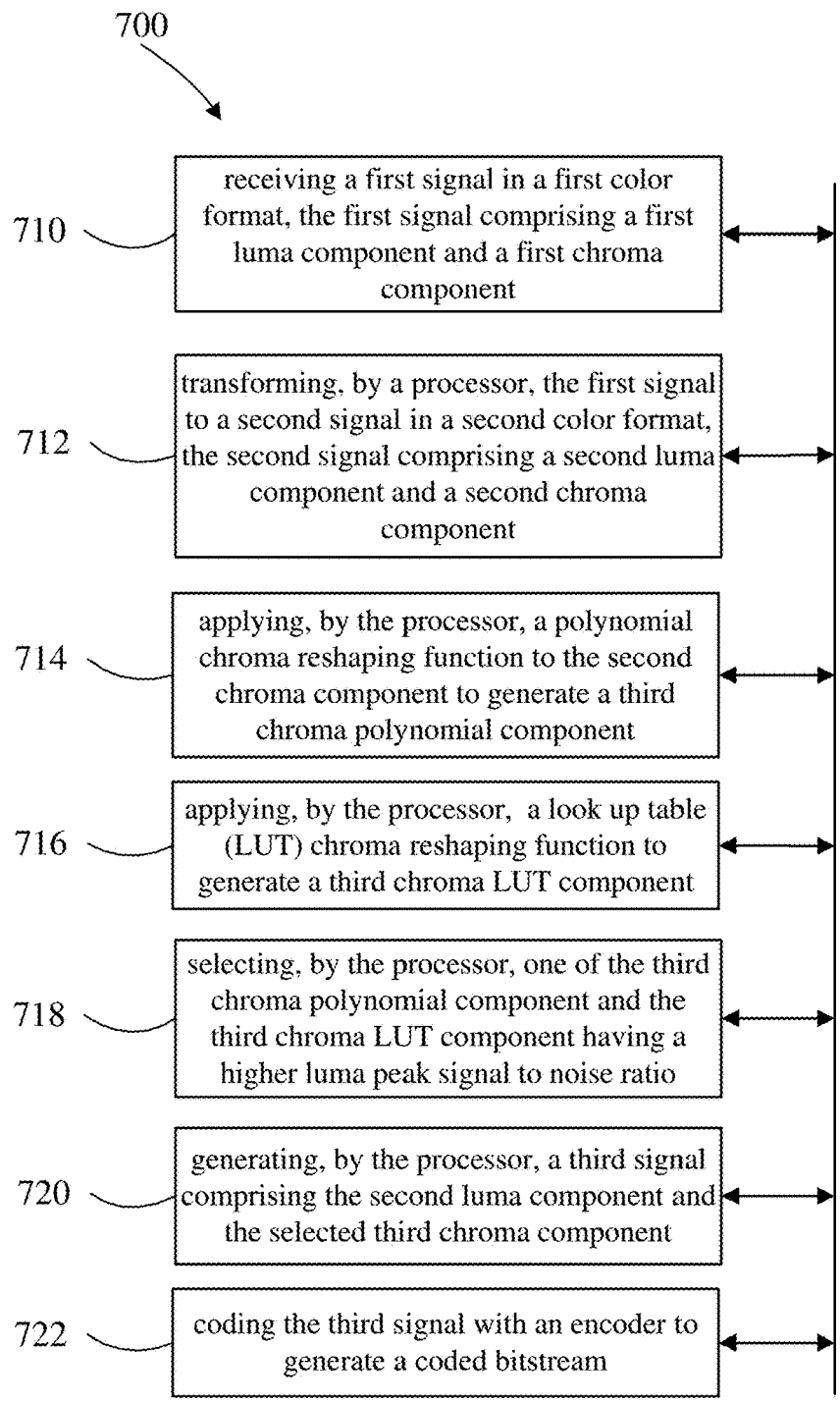
FIG. 7 depicts a second example method of chroma reshaping having a codec friendly input signal in accordance with an embodiment of the disclosure.

FIG. 7 depicts a second method 700 to reshape a high-dynamic range signal comprising receiving 710 a first signal in a first color format, the first signal comprising a first luma component and a first chroma component. The method additionally comprises transforming 712, by a processor, the first signal to a second signal in a second color format, the second signal comprising a second luma component and a second chroma component. The method also comprises both applying 714, by the processor, a polynomial reshaping function to the second chroma component to generate a third chroma polynomial component and applying 716, by the processor, a look up table (LUT) reshaping function to generate a third chroma LUT component. After the two reshaping functions have been applied, selecting 718, by the processor, one of the third chroma polynomial component and the third chroma LUT component having a higher respective peak luma signal to noise ratio, generating 720, by the processor, a third signal comprising the second luma component and the selected third chroma component and coding 722 the third signal with an encoder to generate a coded bitstream. In this example the reshaping yielding the sharpest luma components for the reshaped signal are chosen.

Figure 8:
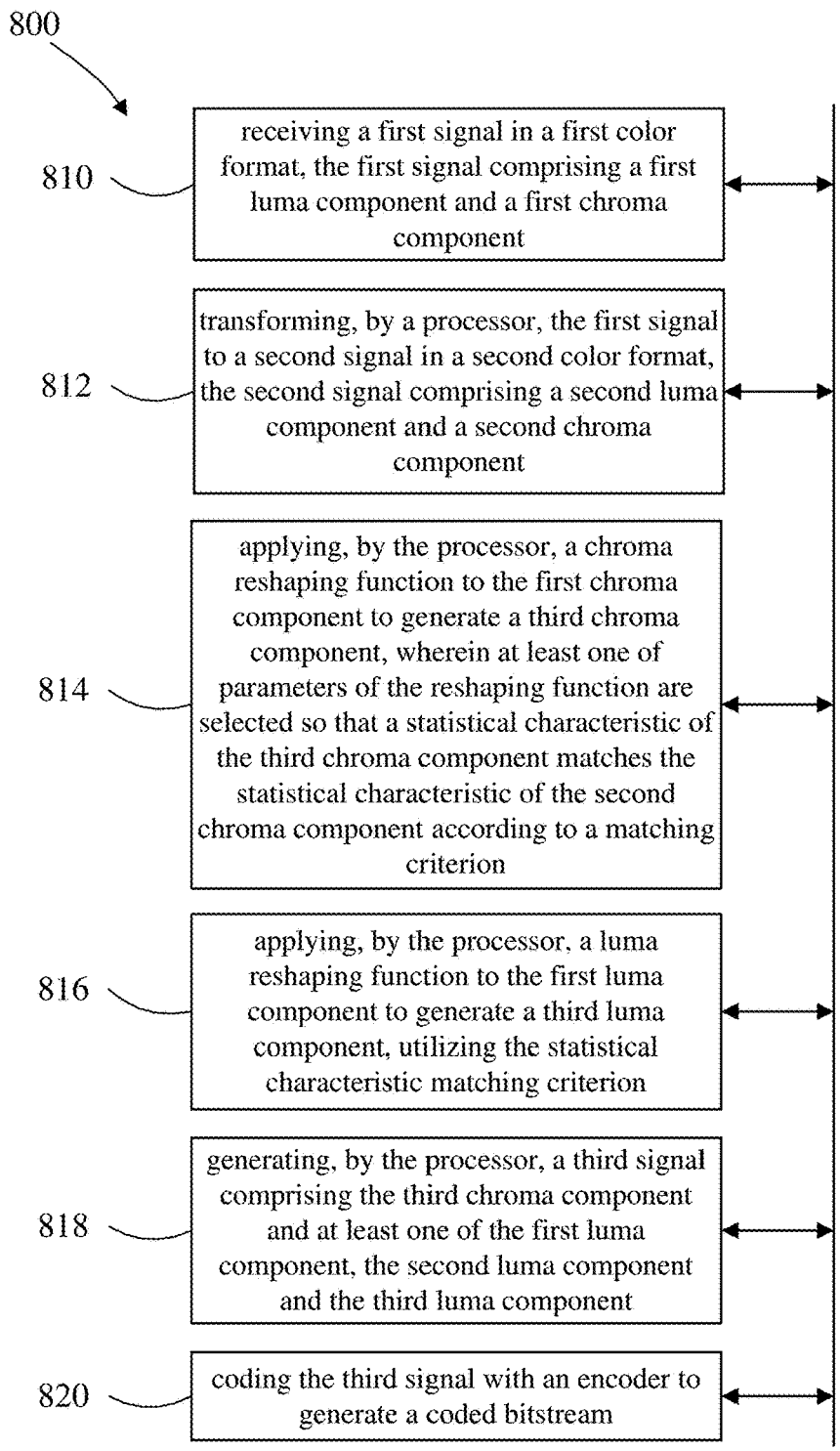
FIG. 8 depicts a third example method of chroma reshaping having a codec unfriendly input signal in accordance with an embodiment of the disclosure.

FIG. 8 depicts a third method 800 to reshape a high-dynamic range signal comprising receiving 810 a first signal in a first color format, the first signal comprising a first luma component and a first chroma component. The method comprises transforming 812, by a processor, the first signal into a second signal in a second color format, the second signal comprising a second luma component and a second chroma component. At this point applying 814, by the processor, a chroma reshaping function to the first chroma component to generate a third chroma component, wherein at least one of parameters of the reshaping function are selected so that a statistical characteristic of the third chroma component matches the statistical characteristic of the second chroma component according to a matching criterion. The method then optionally applies 816, by the processor, a luma reshaping function to the first luma component to generate a third luma component, utilizing the statistical characteristic matching criterion. The statistical characteristic may be a standard deviation, a mean square error, a signal energy and the like. Then generating 818, by the processor, a third signal comprising the third chroma component and at least one of the first luma component, the second luma component and the third luma component and coding 820 the third signal with an encoder to generate a coded bitstream.

Figure 9:
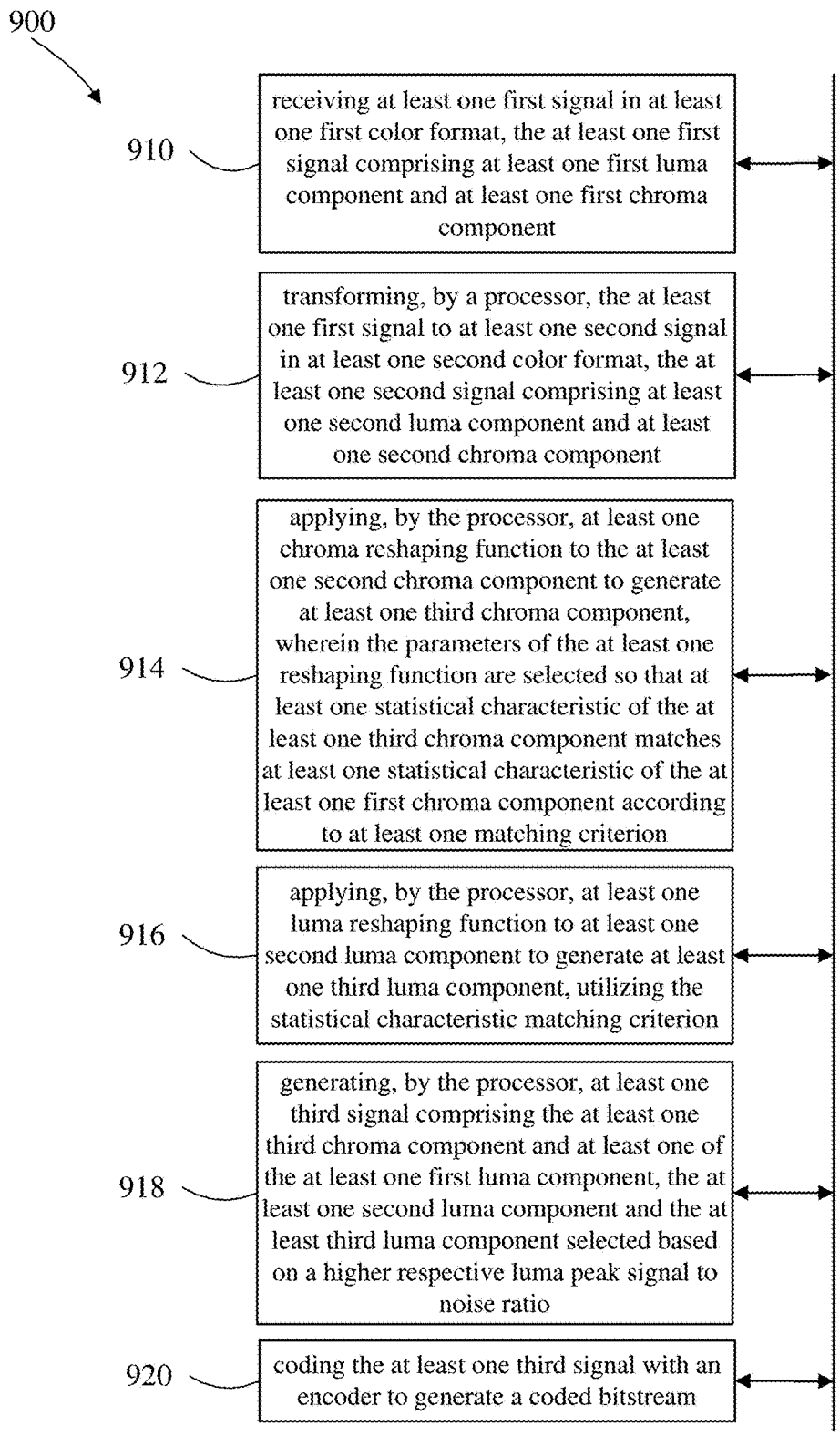
FIG. 9 depicts a fourth example method of chroma reshaping having a codec friendly input signal in accordance with an embodiment of the disclosure.

FIG. 9 depicts a fourth method 900 to reshape a high-dynamic range signal comprising receiving 910 at least one first signal in at least one first color format, the at least one first signal comprising at least one first luma component and at least one first chroma component and transforming 912, by a processor, the at least one first signal to at least one second signal in at least one second color format, the at least one second signal comprising at least one second luma component and at least one second chroma component. The method then comprises applying 914, by the processor, at least one reshaping function to the at least one second chroma component to generate at least one third chroma component, wherein the parameters of the at least one reshaping function are selected so that at least one statistical characteristic of the at least one third chroma component matches at least one statistical characteristic of the at least one first chroma component according to at least one matching criterion. The method then optionally applies 916, by the processor, at least one luma reshaping function to at least one second luma component to generate at least one third luma component, utilizing the statistical characteristic matching criterion. Then the method comprises generating 918, by the processor, at least one third signal comprising the at least one third chroma component and at least one of the first luma component, the second luma component and the third luma component selected based on a higher respective luma peak signal to noise ratio and coding 920 the at least one third signal with an encoder to generate a coded bitstream. In this example, any number of luma and chroma components may be reviewed for selection based on statistical matching to the reference signal.

Figure 10:
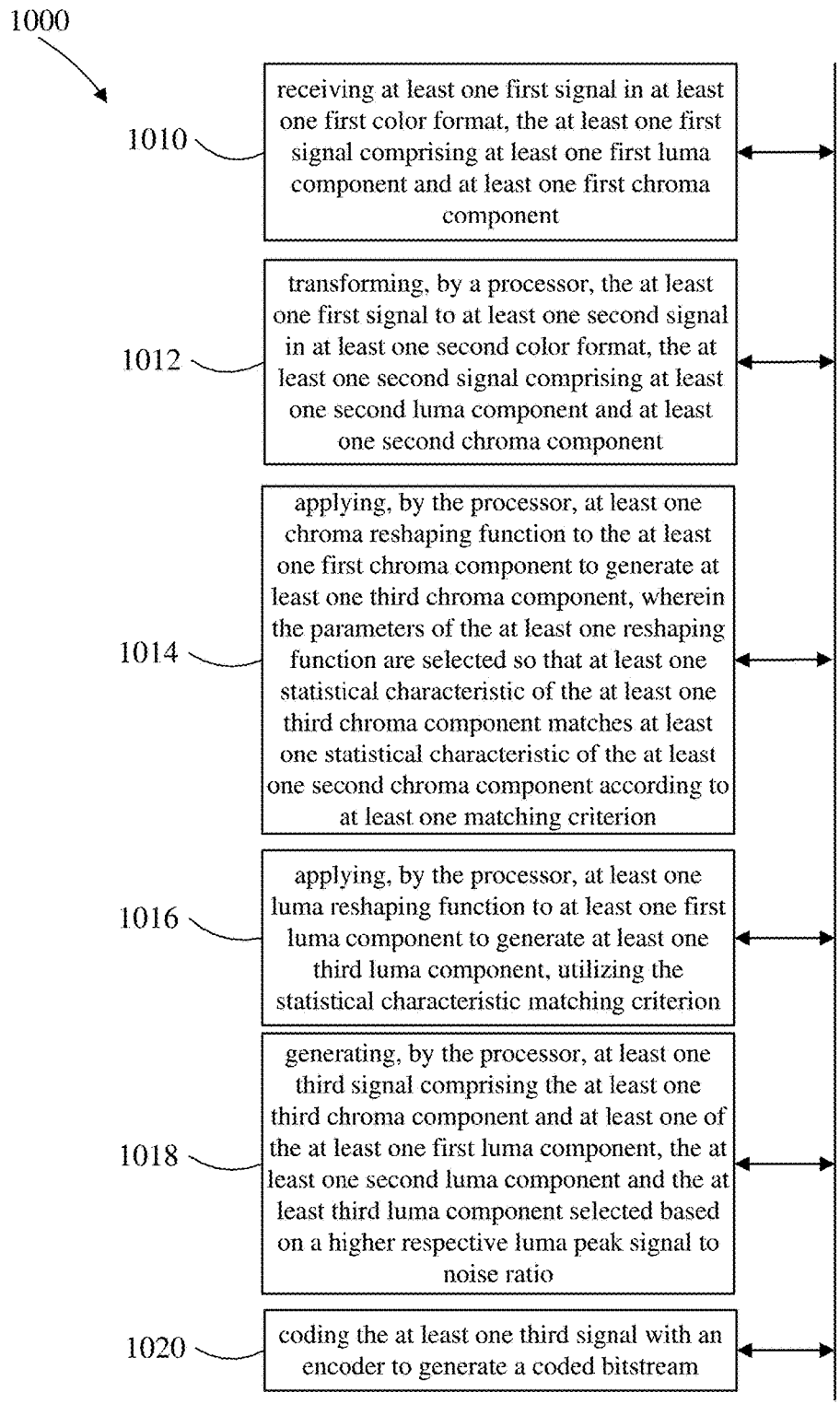
FIG. 10 depicts a fifth example method of chroma reshaping having a codec unfriendly input signal in accordance with an embodiment of the disclosure.

FIG. 10 depicts a fifth method 1000 to reshape a high-dynamic range signal comprising receiving 1010 at least one first signal in at least one first color format, the at least one first signal comprising at least one first luma component and at least one first chroma component and transforming 1012, by a processor, the at least one first signal to at least one second signal in at least one second color format, the at least one second signal comprising at least one second luma component and at least one second chroma component. The method then comprises applying 1014, by the processor, at least one reshaping function to the at least one first chroma component to generate at least one third chroma component, wherein the parameters of the at least one reshaping function are selected so that at least one statistical characteristic of the at least one third chroma component matches at least one statistical characteristic of the at least one second chroma component according to at least one matching criterion. The method then optionally applies 1016, by the processor, at least one luma reshaping function to at least one first luma component to generate at least one third luma component, utilizing the statistical characteristic matching criterion. Then the method comprises generating 1018, by the processor, at least one third signal comprising the at least one third chroma component and at least one of the first luma component, the second luma component and the third luma component selected based on a higher respective luma peak signal to noise ratio and coding 1020 the at least one third signal with an encoder to generate a coded bitstream. In this example, any number of luma and chroma components may be reviewed for selection based on statistical matching to the reference signal.

Figure 11:
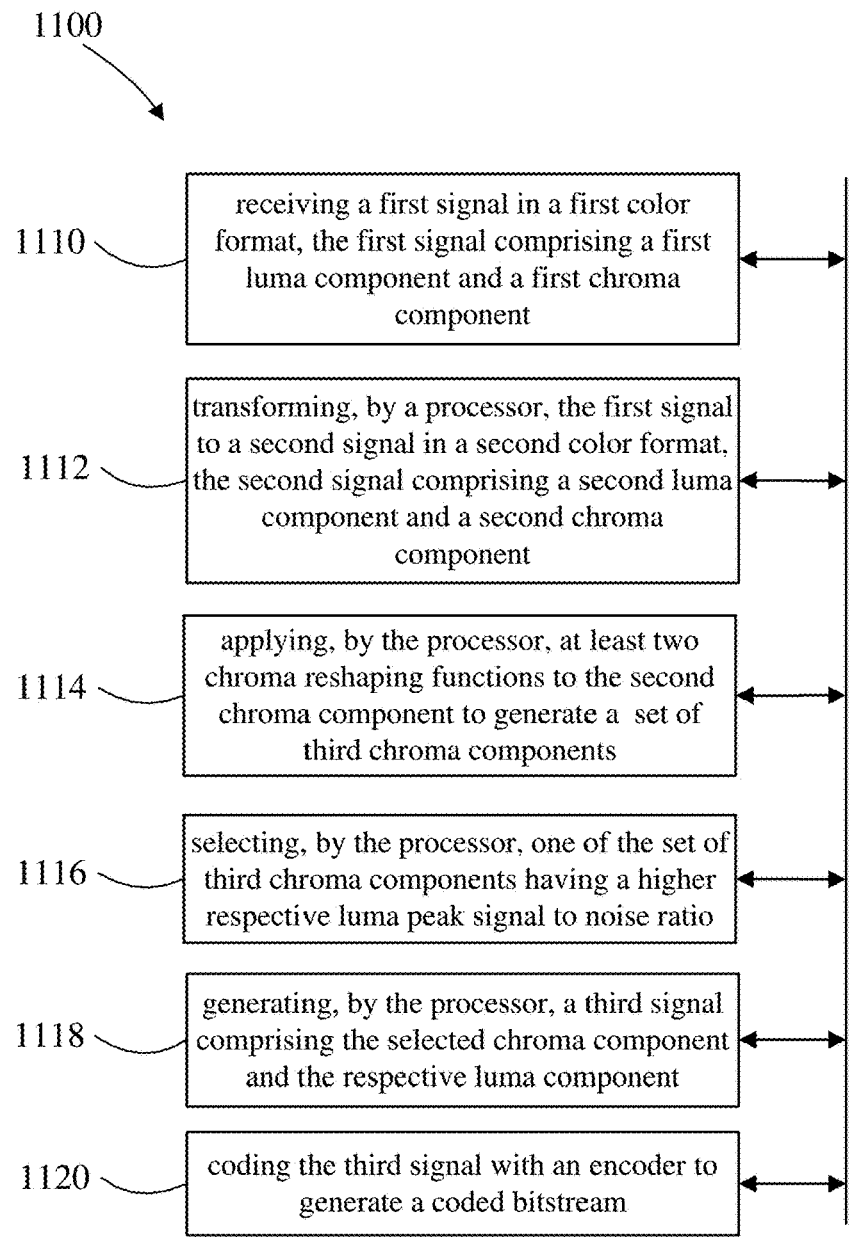
FIG. 11 depicts a sixth example method of chroma reshaping having a codec friendly input signal in accordance with an embodiment of the disclosure.

FIG. 11 depicts a sixth method 1100 to reshape a high-dynamic range signal, in this example the peak signal to noise ratio of the luma component determines the reshaping function selected. The method comprises receiving 1110 a first signal in a first color format, the first signal comprising a first luma component and a first chroma component. In this example the first signal is a reference signal which is codec friendly. The method then transforms 1112, by a processor, the first signal to a second signal in a second color format, the second signal comprising a second luma component and a second chroma component. Then the method applies 1114, by the processor, at least two reshaping functions to the second chroma component to generate a set of third chroma components. The method may apply more than two reshaping functions to the second chroma component. At which point the method selects 1116, by the processor, one of the set of third chroma components having a higher respective luma peak signal to noise ratio, which tends to indicate a sharper picture. Then generating 1118, by the processor, a third signal comprising the selected chroma component and the respective luma component and coding 1120 the third signal with an encoder to generate a coded bitstream. In this example any number of reshaping functions may be applied and the reshaping function generating the highest respective luma peak signal to noise ratio is selected.

Figure 12:
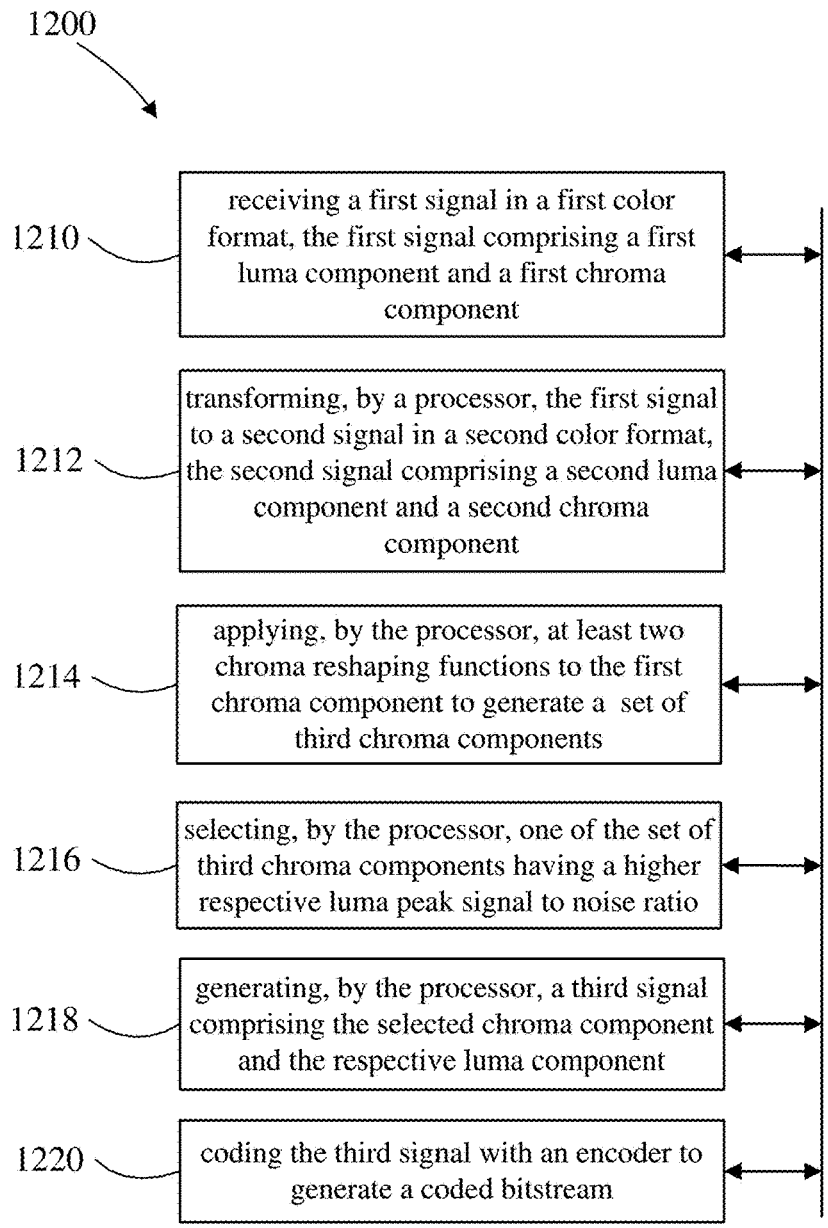
FIG. 12 depicts a seventh example method of chroma reshaping having a coded unfriendly input signal in accordance with an embodiment of the disclosure.

FIG. 12 depicts a seventh example method 1200 to reshape a high-dynamic range signal having an unfriendly first signal, in this example the peak signal to noise ratio of the luma component determines the reshaping function selected. The method comprises receiving 1210 a first signal in a first color format, the first signal comprising a first luma component and a first chroma component. In this example the first signal is codec unfriendly. The method then transforms 1212, by a processor, the first signal to a second signal in a second color format, the second signal comprising a second luma component and a second chroma component. Then the method applies 1214, by the processor, at least two reshaping functions to the first chroma component to generate a set of third chroma components. The method may apply more than two reshaping functions to the first chroma component. At which point the method selects 1216, by the processor, one of the set of third chroma components having a higher respective luma peak signal to noise ratio, which tends to indicate a sharper picture. Then generating 1218, by the processor, a third signal comprising the selected chroma component and the respective luma component and coding 1220 the third signal with an encoder to generate a coded bitstream. In this example any number of reshaping functions may be applied and the reshaping function generating the highest respective luma peak signal to noise ratio is selected.

Figure 13:
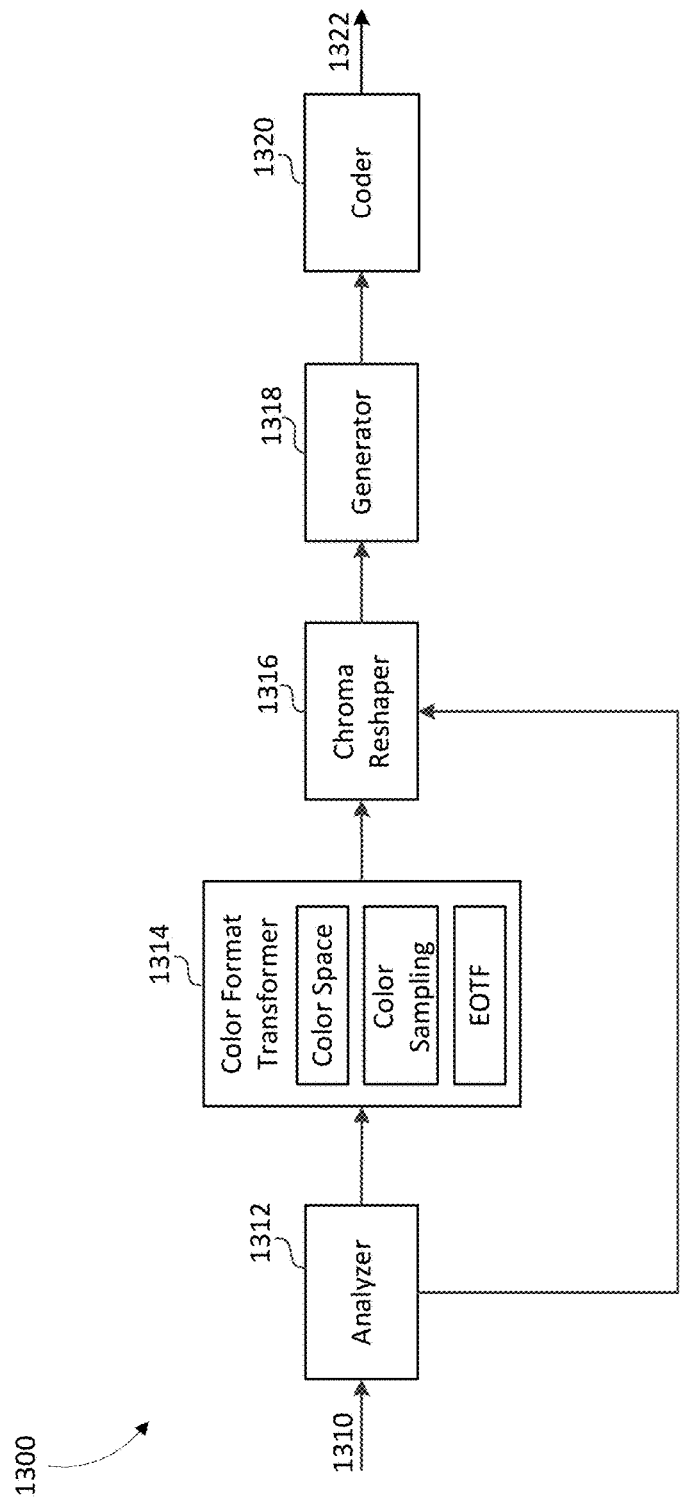
FIG. 13 depicts a reshaping encoder in accordance with an embodiment of the disclosure.

FIG. 13 depicts an example reshaping encoder 1300 to reshape a high-dynamic range signal. The reshaping encoder comprises an analyzer 1312, the analyzer receives a reference signal 1310, in this example, the reference signal is codec friendly. The term codec friendly indicates that the first signal 1310 is in a first color format, comprising a first luma component and a first chroma component that is easily compressed. The analyzer 1312 determines the statistical characteristics of at least the first chroma component. The analyzer 1312 may analyze multiple statistical characteristics of both the first chroma component and the first luma component.

A color format transformer 1314 which may comprise the color space, color sampling and EOTF converter of the example of FIG. 13 is coupled to the analyzer and transforms the first signal into a second signal in a second color format, having a second luma component and a second chroma component. This transformation may be in a codec unfriendly code which enhances the color representation of the first signal. The transformer creates a second signal having statistical characteristics that differ from the first signal. These different statistical characteristics may expand the bit representation of the chroma portion of the signal at the expense of the luma portion of the signal.

A chroma reshaper 1316 is coupled to the transformer and to the analyzer. The chroma reshaper modifies or reshapes the second chroma component to a reshaped chroma component. The reshaping is meant to mimic a statistical characteristic of the reshaped chroma to match the statistical characteristic of the first or reference chroma. The chroma reshaper utilizes a reshaping function that causes at least one statistical characteristic of the reshaped chroma component to match the same at least one statistical characteristic of the first chroma component according to at least one matching criterion.

A generator 1318 is coupled to the chroma reshaper. The generator appends the reshaped chroma component to the second luma component so as to meld a mimicked codec friendly representation of the codec unfriendly chroma with the un-retouched codec unfriendly luma component. The codec unfriendly luma component being typically much easier to compress than a codec unfriendly chroma component.

A coder 1320 is coupled to the generator to encode the third video signal 1322, which is comprised of the reshaped chroma component and at least one of the first luma component, the second luma component and the third luma component.

Several methods have been discussed as to how to reshape the chroma signal from a codec unfriendly color format to a reshaped signal whose signal characteristics are similar to a codec friendly color format. The disclosure provides multiple low complexity solutions that may be performed in real time and may provide a sharper picture luma due to less bits being spent on chroma.

Figure 14:
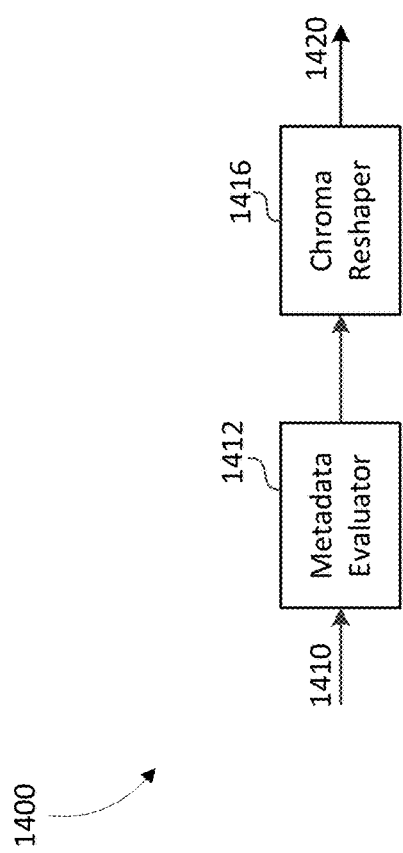
FIG. 14 depicts a reshaping decoder in accordance with an embodiment of the disclosure.

FIG. 14 depicts an example reshaping decoder 1400 to reshape a high-dynamic range signal. The reshaping decoder comprises a metadata evaluator 1412. The metadata evaluator receives an input signal 1410, in this example the third video signal. The metadata has a backward reshaping function for the third video signal. In this example the third video signal is presented in a codec unfriendly color format. The luma component and chroma components use different reshaping functions. The backward reshaping functions for one channel of luma and two channels of chroma will be signaled by metadata, in one example, three channels, three different functions. The decoder thus uses different backward reshaping functions to convert reshaped channels back to an original color format. The metadata evaluator 1412 receives the input signal, in this case the third signal and the metadata allowing an original unshaped signal 1420 to be reconstructed via the chroma reshaper 1416.

Figure 15:
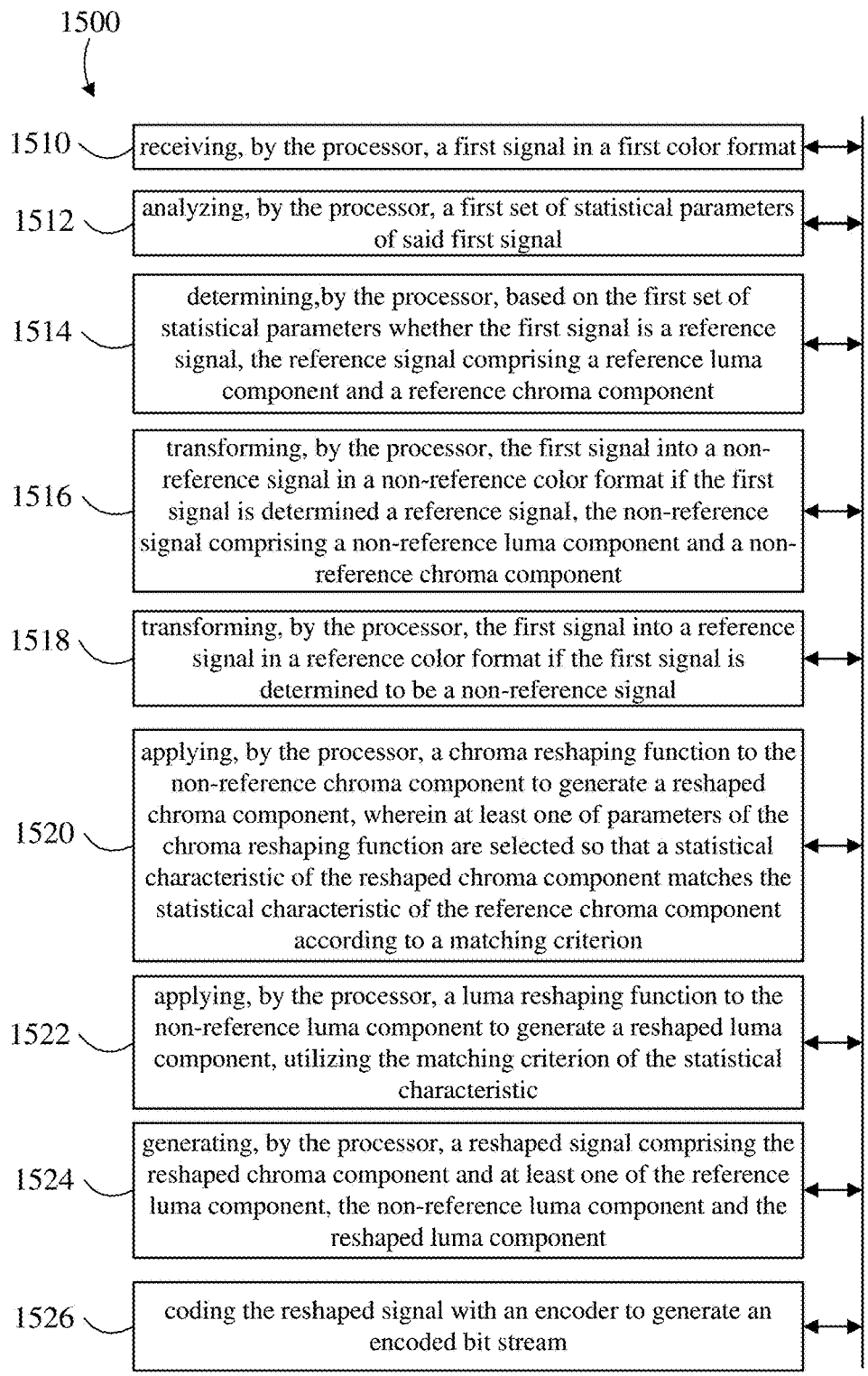
FIG. 15 depicts an eighth example method of chroma reshaping having an indeterminate signal in accordance with an embodiment of the disclosure.

FIG. 15 depicts a method 1500 to reshape a high-dynamic range signal where the first signal is indeterminate, meaning it is not known whether the incoming signal is a reference signal or a codec unfriendly signal. The method comprising receiving 1510, a first signal in a first color format, analyzing 1512, a first set of statistical parameters of said first signal and determining 1514, based on the first set of statistical parameters whether the first signal is a reference signal. For example, the first signal is determined to be a reference signal if a certain statistical parameter, e.g. the standard deviation, the variance, the root mean square error or the mean square error, is below a predetermined threshold. The reference signal comprises a reference luma component and a reference chroma component. The method then comprises transforming 1516, the first signal into a non-reference signal in a non-reference color format if the first signal is determined a reference signal, the non-reference signal comprising a non-reference luma component and a non-reference chroma component and transforming 1518, the first signal into a reference signal in a reference color format if the first signal is determined to be a non-reference signal. Then applying 1520, a chroma reshaping function to the non-reference chroma component to generate a reshaped chroma component, wherein at least one of parameters of the chroma reshaping function are selected so that a statistical characteristic of the reshaped chroma component matches the statistical characteristic of the reference chroma component according to a matching criterion. Also optionally applying 1522, a luma reshaping function to the non-reference luma component to generate a reshaped luma component, utilizing the matching criterion of the statistical characteristic, generating 1524, by the processor, a reshaped signal comprising the reshaped chroma component and at least one of the reference luma component, the non-reference luma component and the reshaped luma component and coding 1526 the reshaped signal with an encoder to generate an encoded bit stream.

Example Computer System Implementation

Embodiments of the instant disclosure may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific integrated circuit (ASIC), and/or apparatus that includes one or more of such systems, devices or components. The computer and/or IC may perform, control, or execute instructions relating to signal reshaping and coding of images with enhanced dynamic range, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the disclosure comprise computer processors which execute software instructions which cause the processors to perform a method of the instant disclosure. For example, one or more processors in a display, an encoder, a set top box, a transcoder or the like may implement methods related to signal reshaping and coding of HDR images as described above by executing software instructions in a program memory accessible to the processors. The instant disclosure may also be provided in the form of a program product. The program product may comprise any non-transitory medium which carries a set of computer-readable signals comprising instructions which, when executed by a data processor, cause the data processor to execute a method of the disclosure. Program products according to the disclosure may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the disclosure.

EQUIVALENTS, EXTENSIONS, ALTERNATIVES AND MISCELLANEOUS

Example embodiments that relate to the efficient signal reshaping and coding of HDR images are thus described. In the foregoing specification, embodiments of the present disclosure have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. While most discussions within the disclosure pertain to IPT-PQ, the methods and devices may be applicable to other color formats suitable for HDR imaging including ICtCp, HLG and the like.

Various aspects of the present invention may be appreciated from the following enumerated example embodiments (EEEs):

EEE 1. A method to reshape a high-dynamic range signal, the method comprising:
  receiving a first signal in a first color format, the first signal comprising a first luma component and a first chroma component;
  transforming, by a processor, the first signal to a second signal in a second color format, the second signal comprising a second luma component and a second chroma component;
  applying, by the processor, a chroma reshaping function to the second chroma component to generate a third chroma component, wherein at least one of parameters of the chroma reshaping function are selected so that a statistical characteristic of the third chroma component matches the statistical characteristic of the first chroma component according to a matching criterion;
  applying, by the processor, a luma reshaping function to the second luma component to generate a third luma component, utilizing the matching criterion of the statistical characteristic;
  generating, by the processor, a third signal comprising the third chroma component and at least one of the first luma component, the second luma component and the third luma component; and
  coding the third signal with an encoder to generate a coded bitstream.

EEE 2. The method of EEE 1, wherein the matching criterion is to minimize a mean square error between pixel values of the first chroma component and the third chroma component.

EEE 3. The method of EEE 1, wherein the matching criterion is to minimize a difference of a standard deviation distribution between pixel values of the first chroma component and the third chroma component.

EEE 4. The method of EEE 1, wherein the matching criterion is to minimize a difference of an amount of energy distribution in the third signal.

EEE 5. The method of EEE 1, wherein the chroma reshaping function comprises a zero order polynomial.

EEE 6. The method of EEE 1, wherein the chroma reshaping function comprises a first order polynomial.

EEE 7. The method of EEE 1, wherein the chroma reshaping function comprises a second order polynomial.

EEE 8. The method of EEE 1, wherein the chroma reshaping function comprises a nth-order polynomial.

EEE 9. The method of EEE 1, wherein the chroma reshaping function comprises a multi-piece polynomial.

EEE 10. The method of EEE 1, wherein the chroma reshaping function comprises a look up table (LUT).

EEE 11. The method of EEE 1, wherein the at least one of the first luma component, the second luma component and the third luma component is selected for generation based on a higher respective luma peak signal to noise ratio.

EEE 12. The method of EEE 1, wherein the first chroma component is resampled.

EEE 13. The method of EEE 1, wherein the first color format comprises at least one of a first color space, a first color sampling and a first EOTF.

EEE 14. The method of EEE 1, wherein the second color format comprises at least one of a second color space, a second color sampling and a second EOTF.

EEE 15. A method to reshape a high-dynamic range signal, the method comprising:
- receiving a first signal in a first color format, the first signal comprising a first luma component and a first chroma component;
- transforming, by a processor, the first signal to a second signal in a second color format, the second signal comprising a second luma component and a second chroma component;
- applying, by the processor, a polynomial chroma reshaping function to the second chroma component to generate a third chroma polynomial component;
- applying, by the processor, a look up table (LUT) chroma reshaping function to generate a third chroma LUT component;
- selecting, by the processor, one of the third chroma polynomial component and the third chroma LUT component having a higher luma peak signal to noise ratio;
- generating, by the processor, a third signal comprising the second luma component and a selected third chroma component; and
- coding the third signal with an encoder to generate a coded bitstream.

EEE 16. The method of EEE 15, wherein the polynomial chroma reshaping function comprises a zero order polynomial.

EEE 17. The method of EEE 15, wherein the polynomial chroma reshaping function comprises a first order polynomial.

EEE 18. The method of EEE 15, wherein the polynomial chroma reshaping function comprises a second order polynomial.

EEE 19. The method of EEE 15, wherein the polynomial chroma reshaping function comprises a nth-order polynomial.

EEE 20. The method of EEE 15, wherein the polynomial chroma reshaping function comprises a multi-piece polynomial.

EEE 21. The method of EEE 15, wherein the look up table is one dimensional.

EEE 22. The method of EEE 15, wherein at least one of the polynomial chroma reshaping function and the look up table chroma reshaping function are forward reshaping.

EEE 23. The method of EEE 15, wherein the first chroma component is resampled.

EEE 24. The method of EEE 15, wherein the first color format comprises at least one of a first color space, a first color sampling and a first EOTF.

EEE 25. The method of EEE 15, wherein the second color format comprises at least one of a second color space, a second color sampling and a second EOTF.

EEE 26. A method to reshape a high-dynamic range signal, the method comprising:
- receiving a first signal in a first color format, the first signal comprising a first luma component and a first chroma component;
- transforming, by a processor, the first signal to a second signal in a second color format, the second signal comprising a second luma component and a second chroma component;
- applying, by the processor, a chroma reshaping function to the first chroma component to generate a third chroma component, wherein at least one of parameters of the chroma reshaping function are selected so that a statistical characteristic of the third chroma component matches the statistical characteristic of the second chroma component according to a matching criterion;
- applying, by the processor, a luma reshaping function to the first luma component to generate a third luma component, utilizing the matching criterion of the statistical characteristic;
- generating, by the processor, a third signal comprising the third chroma component and at least one of the first luma component, the second luma component and the third luma component selected based on a higher respective luma peak signal to noise ratio; and
- coding the third signal with an encoder to generate a coded bitstream.

EEE 27. The method of EEE 26, wherein the matching criterion is to minimize a mean square error between pixel values of the second chroma component and the third chroma component.

EEE 28. The method of EEE 26, wherein the matching criterion is to minimize a difference of standard deviation distribution between pixel values of the second chroma component and the third chroma component.

EEE 29. The method of EEE 26, wherein the matching criterion is to minimize a difference of an amount of energy distribution in the third signal.

EEE 30. The method of EEE 26, wherein the chroma reshaping function comprises at least one of a zero order polynomial, a first order polynomial, a second order polynomial, an nth-order polynomial, a multi-piece polynomial and a look up table.

EEE 31. The method of EEE 26, wherein the first color format comprises at least one of a first color space, a first color sampling and a first EOTF.

EEE 32. The method of EEE 26, wherein the second color format comprises at least one of a second color space, a second color sampling and a second EOTF.

EEE 33. A method to reshape a high-dynamic range signal, the method comprising:
- receiving at least one first signal in at least one first color format, the at least one first signal comprising at least one first luma component and at least one first chroma component;
- transforming, by a processor, the at least one first signal to at least one second signal in at least one second color format, the at least one second signal comprising at least one second luma component and at least one second chroma component;
- applying, by the processor, at least one chroma reshaping function to the at least one second chroma component to generate at least one third chroma component, wherein parameters of the at least one reshaping function are selected so that at least one statistical characteristic of the at least one third chroma component matches at least one statistical characteristic of the at least one first chroma component according to at least one matching criterion;
- applying, by the processor, at least one luma reshaping function to the at least one second luma component to generate at least one third luma component, utilizing the matching criterion of the statistical characteristic;

generating, by the processor, at least one third signal comprising the at least one third chroma component and at least one of the at least one first luma component, the at least one second luma component and the at least one third luma component; and coding the at least one third signal with an encoder to generate a coded bitstream.

EEE 34. The method of EEE 33, wherein the at least one matching criterion is to minimize a mean square error between pixel values of the at least one first chroma component and the at least one third chroma component.

EEE 35. The method of EEE 33, wherein the matching criterion is to minimize a difference of a standard deviation distribution between pixel values of the at least one first chroma component and the at least one third chroma component.

EEE 36. The method of EEE 33, wherein the at least one matching criterion is to minimize a difference of an amount of energy distribution in the at least one third signal.

EEE 37. The method of EEE 33, wherein the at least one chroma reshaping function comprises at least one of a zero order polynomial, a first order polynomial, a second order polynomial, an nth-order polynomial, a multi-piece polynomial and a look up table.

EEE 38. The method of EEE 33, wherein the at least one chroma reshaping function is forward reshaping.

EEE 39. The method of EEE 33, wherein the at least one first chroma component is resampled.

EEE 40. The method of EEE 33, wherein the first color format comprises at least one of a first color space, a first color sampling and a first EOTF.

EEE 41. The method of EEE 33, wherein the second color format comprises at least one of a second color space, a second color sampling and a second EOTF.

EEE 42. A method to reshape a high-dynamic range signal, the method comprising:
receiving at least one first signal in at least one first color format, the at least one first signal comprising at least one first luma component and at least one first chroma component;
transforming, by a processor, the at least one first signal to at least one second signal in at least one second color format, the at least one second signal comprising at least one second luma component and at least one second chroma component;
applying, by the processor, at least one chroma reshaping function to the at least one first chroma component to generate at least one third chroma component, wherein the parameters of the at least one reshaping function are selected so that at least one statistical characteristic of the at least one third chroma component matches at least one statistical characteristic of the at least one second chroma component according to at least one matching criterion;
applying, by the processor, at least one luma reshaping function to the at least one first luma component to generate at least one third luma component, utilizing the matching criterion of the statistical characteristic;
generating, by the processor, at least one third signal comprising the at least one third chroma component and at least one of the at least one first luma component, the at least one second luma component and the at least one third luma component; and coding the at least one third signal with an encoder to generate a coded bitstream.

EEE 43. The method of EEE 42, wherein the at least one matching criterion is to minimize a mean square error between pixel values of the at least one second chroma component and the at least one third chroma component.

EEE 44. The method of EEE 42, wherein the matching criterion is to minimize a difference of a standard deviation distribution between pixel values of the at least one second chroma component and the at least one third chroma component.

EEE 45. The method of EEE 42, wherein the at least one matching criterion is to minimize a difference of an amount of energy distribution in the at least one third signal.

EEE 46. The method of EEE 42, wherein the at least one chroma reshaping function comprises at least one of a zero order polynomial, a first order polynomial, a second order polynomial, an nth-order polynomial, a multi-piece polynomial and a look up table.

EEE 47. The method of EEE 42, wherein the at least one chroma reshaping function is forward reshaping.

EEE 48. The method of EEE 42, wherein the at least one first chroma component is resampled.

EEE 49. The method of EEE 42, wherein the first color format comprises at least one of a first color space, a first color sampling and a first EOTF.

EEE 50. The method of EEE 42, wherein the second color format comprises at least one of a second color space, a second color sampling and a second EOTF.

EEE 51. A method to reshape a high-dynamic range signal, the method comprising:
receiving a first signal in a first color format, the first signal comprising a first luma component and a first chroma component;
transforming, by a processor, the first signal to a second signal in a second color format, the second signal comprising a second luma component and a second chroma component;
applying, by the processor, at least two chroma reshaping functions to the second chroma component to generate a set of third chroma components;
selecting, by the processor, one of the set of third chroma components having a higher respective luma peak signal to noise ratio;
generating, by the processor, a third signal comprising the selected third chroma component and a respective third luma component; and
coding the third signal with an encoder to generate a coded bitstream.

EEE 52. The method of EEE 51, wherein the first color format comprises at least one of a first color space, a first color sampling and a first EOTF.

EEE 53. The method of EEE 51, wherein the second color format comprises at least one of a second color space, a second color sampling and a second EOTF.

EEE 54. A method to reshape a high-dynamic range signal, the method comprising:
receiving a first signal in a first color format, the first signal comprising a first luma component and a first chroma component;
transforming, by a processor, the first signal to a second signal in a second color format, the second signal comprising a second luma component and a second chroma component;

applying, by the processor, at least two chroma reshaping functions to the first chroma component to generate a set of third chroma components;

selecting, by the processor, one of the set of third chroma components having a higher respective luma peak signal to noise ratio;

generating, by the processor, a third signal comprising the selected third chroma component and a respective third luma component; and coding the third signal with an encoder to generate a coded bitstream.

EEE 55. The method of EEE 54, wherein the first color format comprises at least one of a first color space, a first color sampling and a first EOTF.

EEE 56. The method of EEE 54, wherein the second color format comprises at least one of a second color space, a second color sampling and a second EOTF.

EEE 57. A reshaping encoder to reshape a high-dynamic range signal, the reshaping encoder comprising:
an analyzer configured to receive a first signal in a first color format, the first signal comprising a first luma component a first chroma component and to determine at least one statistical characteristic of the first chroma component;
a transformer coupled to the analyzer to compress the first signal to a second signal in a second color format, the second signal comprising a second luma component and a second chroma component;
a chroma reshaper coupled to the transformer and to the analyzer to reshape the second chroma component to a third chroma component utilizing a chroma reshaping function based on a match of at least one statistical characteristic of the third chroma component to the at least one statistical characteristic of the first chroma component according to at least one matching criterion;
a generator coupled to the chroma reshaper to generate a third signal comprising the second luma component and the third chroma component; and
a coder coupled to the generator to encode the third signal.

EEE 58. The reshaping encoder of EEE 57, wherein the at least one matching criterion minimizes a mean square error between pixel values of the first chroma component and the third chroma component.

EEE 59. The reshaping encoder of EEE 57, wherein the at least one matching criterion minimizes a difference of a standard deviation distribution between pixel values of the first chroma component and the third chroma component.

EEE 60. The reshaping encoder of EEE 57, wherein the at least one matching criterion minimizes a difference of an amount of energy distribution in the third signal.

EEE 61. The reshaping encoder of EEE 57, wherein the chroma reshaping function comprises at least one of a zero order polynomial, a first order polynomial, a second order polynomial, an nth-order polynomial, a multi-piece polynomial and a look up table.

EEE 62. The reshaping encoder of EEE 57, wherein the chroma reshaping function is forward reshaping.

EEE 63. The reshaping encoder of EEE 57, wherein the first signal comprises a reference signal.

EEE 64. The reshaping encoder of EEE 57, wherein the first color format comprises at least one of a first color space, a first color sampling and a first EOTF.

EEE 65. The reshaping encoder of EEE 57, wherein the second color format comprises at least one of a second color space, a second color sampling and a second EOTF.

EEE 66. A reshaping decoder to reshape a high-dynamic range signal, the reshaping decoder comprising:
a metadata evaluator configured to receive a third signal in a third color format, the third signal comprising a third luma component, a third chroma component, and a third signal metadata; and
a chroma reshaper coupled the metadata evaluator to reshape the third chroma component to an unshaped chroma component utilizing a reshaping function based on the third signal metadata.

EEE 67. The reshaping decoder of EEE 66, wherein the third color format comprises at least one of a third color space, a third color sampling and a third EOTF.

EEE 68. A method to reshape a high-dynamic range signal, the method comprising:
receiving, by a processor, a first signal in a first color format;
analyzing, by the processor, a first set of statistical parameters of said first signal;
determining, by the processor, based on the first set of statistical parameters whether the first signal is a reference signal;
transforming, by the processor, the first signal into a non-reference signal in a non-reference color format if the first signal is determined the reference signal, the non-reference signal comprising a non-reference luma component and a non-reference chroma component;
transforming, by the processor, the first signal into the reference signal in a reference color format if the first signal is determined to be the non-reference signal, the reference signal comprising a reference luma component and a reference chroma component;
applying, by the processor, a chroma reshaping function to the non-reference chroma component to generate a reshaped chroma component, wherein at least one of parameters of the chroma reshaping function are selected so that a statistical characteristic of the reshaped chroma component matches the statistical characteristic of the reference chroma component according to a matching criterion;
applying, by the processor, a luma reshaping function to the non-reference luma component to generate a reshaped luma component, utilizing the matching criterion of the statistical characteristic;
generating, by the processor, a reshaped signal comprising the reshaped chroma component and at least one of the reference luma component, the non-reference luma component and the reshaped luma component; and
coding the reshaped signal with an encoder to generate an encoded bit stream.

EEE 69. The method of EEE 68, wherein the matching criterion is to minimize a mean square error between pixel values of the reference chroma component and the reshaped chroma component.

EEE 70. The method of EEE 68, wherein the matching criterion is to minimize a difference of a standard deviation distribution between pixel values of the reference chroma component and the reshaped chroma component.

EEE 71. The method of EEE 68, wherein the matching criterion is to minimize a difference of an amount of energy distribution in the reshaped signal.

EEE 72. The method of EEE 68, wherein the chroma reshaping function comprises a zero order polynomial.

EEE 73. The method of EEE 68, wherein the chroma reshaping function comprises a first order polynomial.

EEE 74. The method of EEE 68, wherein the chroma reshaping function comprises a second order polynomial.

EEE 75. The method of EEE 68, wherein the chroma reshaping function comprises a nth-order polynomial.

EEE 76. The method of EEE 68, wherein the chroma reshaping function comprises a multi-piece polynomial.

EEE 77. The method of EEE 69, wherein the chroma reshaping function comprises a look up table (LUT).

EEE 78. The method of EEE 68, wherein the at least one of the reference luma component, the non-reference luma component and the reshaped luma component is selected for generation based on a higher respective luma peak signal to noise ratio.

EEE 79. The method of EEE 68, wherein the reference color format comprises at least one of a reference color space, a reference color sampling and a reference EOTF.

EEE 80. The method of EEE 68, wherein the non-reference color format comprises at least one of a non-reference color space, a non-reference color sampling and a non-reference EOTF.

The invention claimed is:

1. A method to reshape a high-dynamic range video signal, the method comprising:
   obtaining a first video signal representing the high-dynamic range video signal in a first color format comprising a first chroma component;
   analyzing, by a processor, a first set of statistical parameters of said first video signal;
   determining, by the processor, based on the first set of statistical parameters whether the first video signal is a reference signal by comparing at least one of the first set of statistical parameters to a corresponding predetermined threshold value;
   transforming, by the processor, the first video signal to a second video signal in a second color format based on the determining, wherein the transforming transforms the first video signal to have a reference color format if the first video signal was determined to not be a reference signal and transforms the first video signal to have a non-reference color format if the first video signal was determined to be a reference signal;
   if the first video signal is determined to be a reference signal, applying, by the processor, a chroma reshaping function to the second chroma component of the second video signal to generate a reshaped chroma component and if the first video signal is determined to not be a reference signal, applying, by the processor, a chroma reshaping function to the first chroma component of the first video signal to generate a reshaped chroma component, wherein the chroma reshaping function maps pixel values of the second chroma component of the second color format to pixel values of the first chroma component of the first color format, wherein at least one parameter of the chroma reshaping function is determined by fitting the chroma reshaping function to pixel values (vji) of the second chroma component of the second video signal and corresponding pixel values (sji) of the first chroma component of the first video signal;
   generating, by the processor, a third video signal comprising the reshaped chroma component.

2. The method of claim 1, wherein the chroma reshaping function comprises a polynomial or a multi-piece polynomial, wherein the at least one parameter of the chroma reshaping function comprises the coefficients of the polynomial or multi-piece polynomial.

3. The method of claim 1, wherein the chroma reshaping function comprises a look up table (LUT) comprising key-value pairs, the keys of the key-value pairs corresponding to pixel values vji of the second chroma component and the values of the key-value pairs corresponding to pixel values sji of the first chroma component, the at least one parameter comprising the values of the key-value pairs of the LUT.

4. The method of claim 3, wherein for each key corresponding to a pixel values vji of the second chroma component of the second video signal, a respective value of the respective key-value pair is determined as an average of corresponding pixel values sji of the first chroma component of the first video signal, wherein the method further comprises interpolating values of key-value pairs to obtain a value for a key that is not included as pixel value vji in the second chroma component of the second video signal.

5. The method of claim 1, further comprising coding the third video signal with an encoder to generate a coded bitstream, optionally further comprising including in the coded bitstream metadata describing the reshaping function or its inverse.

6. The method of claim 1, wherein the at least one parameter of the reshaping function is determined so that a statistical characteristic of the reshaped chroma component matches a same statistical characteristic of the first chroma component if the first video signal is determined to be a reference signal or the second chroma component if the first video signal is determined to not be a reference signal according to a matching criterion.

7. The method of claim 6, wherein the matching criterion is to minimize:
   a mean square error between pixel values of the first chroma component and corresponding pixel values of the third chroma component; or
   a difference of a standard deviation distribution between pixel values of the first chroma component and corresponding pixel values of the pixel third chroma component; or
   a difference of an amount of energy distribution in the third signal.

8. The method of claim 1, wherein the first video signal further comprises a first luma component and the second video signal further comprises a second luma component, and the third video signal further comprises one of the first luma component of the first video signal, the second luma component of the second video signal and a third luma component obtained by applying, by the processor, a luma reshaping function to the second luma component of the second video signal, wherein the one of the first luma component, the second luma component and the third luma component is selected that has the highest luma peak signal to noise ratio.

9. The method of claim 1, wherein the first chroma component is resampled.

10. The method of claim 1, wherein:
    the first color format comprises at least one of a first color space, a first color sampling and a first EOTF, wherein the first color space is one of YCbCr, YCoCg and RGB and the first EOTF is gamma; and/or
    the second color format comprises at least one of a second color space, a second color sampling and a second EOTF, wherein the second color space is one of IPT and ICTCP, and the second EOTF is PQ or HLG.

11. An apparatus comprising one or more processors configured to implement the method of claim 1.

12. A non-transitory computer-readable storage medium having stored thereon computer-executable instruction for executing a method with one or more processors in accordance with claim 1.

* * * * *